(12) United States Patent
Stark et al.

(10) Patent No.: US 11,986,758 B2
(45) Date of Patent: May 21, 2024

(54) FILTER ELEMENT AND FILTER ARRANGEMENT

(71) Applicant: MANN+HUMMEL GmbH, Ludwigsburg (DE)

(72) Inventors: Dennis Stark, Mauer (DE); Beate Brandt, Altlussheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 18/323,913

(22) Filed: May 25, 2023

(65) Prior Publication Data

US 2023/0321577 A1  Oct. 12, 2023

Related U.S. Application Data

(63) Continuation of application No. 16/524,763, filed on Jul. 29, 2019, now Pat. No. 11,701,607, which is a continuation of application No. 15/095,129, filed on Apr. 10, 2016, now Pat. No. 10,363,506.

(60) Provisional application No. 62/186,600, filed on Jun. 30, 2015.

(30) Foreign Application Priority Data

Apr. 10, 2015  (DE) .................... 10 2015 004 380.3

(51) Int. Cl.
| | | |
|---|---|---|
| *B01D 45/12* | (2006.01) |
| *B01D 46/00* | (2022.01) |
| *B01D 46/24* | (2006.01) |
| *B01D 46/52* | (2006.01) |
| *F02M 35/02* | (2006.01) |
| *F02M 35/024* | (2006.01) |

(52) U.S. Cl.
CPC ......... *B01D 45/12* (2013.01); *B01D 46/0005* (2013.01); *B01D 46/24* (2013.01); *B01D 46/2414* (2013.01); *B01D 46/52* (2013.01); *F02M 35/02* (2013.01); *F02M 35/02416* (2013.01); *F02M 35/02441* (2013.01); *F02M 35/02483* (2013.01); *B01D 2271/02* (2013.01); *B01D 2271/027* (2013.01); *B01D 2273/30* (2013.01); *B01D 2275/208* (2013.01)

(58) Field of Classification Search
None
See application file for complete search history.

(56) References Cited

U.S. PATENT DOCUMENTS

| | | | |
|---|---|---|---|
| 5,238,474 A * | 8/1993 | Kahlbaugh | B01D 46/521 55/486 |
| 8,652,327 B2 * | 2/2014 | Lucas | B01D 36/001 210/DIG. 5 |
| D884,866 S * | 5/2020 | Knight | D23/365 |

(Continued)

*Primary Examiner* — Christopher P Jones
*Assistant Examiner* — Brit E. Anbacht

(57) ABSTRACT

A filter element, which has an oval cross-section in a longitudinal direction thereof and includes a circumferential sealing device for, in particular, radially sealing the filter element off from a filter holder for the filter element, wherein the sealing device has two first curvature sections arranged one facing the other and two second curvature sections arranged one facing the other, wherein the first curvature sections each have a first radius of curvature and the second curvature sections each have a second radius of curvature, and wherein the first radius of curvature differs from the second radius of curvature.

15 Claims, 32 Drawing Sheets

(56) References Cited

U.S. PATENT DOCUMENTS

| | | | |
|---|---|---|---|
| 10,758,859 B2 * | 9/2020 | Gieseke | B01D 46/525 |
| 10,918,978 B2 * | 2/2021 | Knight | F02M 35/02425 |
| D930,136 S * | 9/2021 | Knight | D23/365 |
| 11,498,022 B2 * | 11/2022 | Schwartz | B01D 46/2414 |
| 2003/0182911 A1 * | 10/2003 | Schrage | B01D 46/2414 55/498 |
| 2004/0216434 A1 * | 11/2004 | Gunderson | B01D 29/908 55/498 |
| 2007/0006560 A1 * | 1/2007 | Ruhland | B01D 46/523 55/497 |
| 2007/0039296 A1 * | 2/2007 | Schrage | B01D 29/012 55/497 |
| 2008/0041026 A1 * | 2/2008 | Engel | B01D 46/521 55/432 |
| 2010/0037570 A1 * | 2/2010 | Osendorf | B01D 46/521 55/502 |
| 2010/0242423 A1 * | 9/2010 | Morgan | B01D 46/58 156/304.3 |
| 2014/0208702 A1 * | 7/2014 | Lundgren | B01D 46/4227 55/357 |
| 2014/0237966 A1 * | 8/2014 | Chin | B01D 46/121 55/483 |
| 2014/0373495 A1 * | 12/2014 | Madeira | F02M 35/02416 55/502 |
| 2016/0023137 A1 * | 1/2016 | Sorger | B01D 46/10 210/493.5 |
| 2016/0101380 A1 * | 4/2016 | Pereira Madeira | B01D 46/009 210/232 |
| 2016/0115917 A1 * | 4/2016 | Sorger | F02M 35/0203 55/501 |
| 2016/0131094 A1 * | 5/2016 | Pereira Madeira | F02M 35/02483 96/414 |
| 2016/0296867 A1 * | 10/2016 | Stark | B01D 45/12 |
| 2016/0296868 A1 * | 10/2016 | Stark | B01D 46/2414 |
| 2016/0296869 A1 * | 10/2016 | Stark | F02M 35/0202 |
| 2016/0296872 A1 * | 10/2016 | Stark | B01D 46/0045 |
| 2017/0122270 A1 * | 5/2017 | Williams | B01D 46/521 |
| 2017/0368487 A1 * | 12/2017 | Bannister | B01D 46/0039 |
| 2018/0008923 A1 * | 1/2018 | Burton | B01D 46/4227 |
| 2018/0050296 A1 * | 2/2018 | Fritzsching | B01D 46/2414 |
| 2019/0344207 A1 * | 11/2019 | Knight | B01D 46/0005 |
| 2020/0384402 A1 * | 12/2020 | Schwartz | B01D 46/0005 |

\* cited by examiner

FILTER ELEMENT AND FILTER ARRANGEMENT

CROSS-REFERENCE TO RELATED APPLICATIONS

This application is a Continuation of U.S. application Ser. No. 16/524,763 filed 29 Jul. 2019 which is a Continuation of U.S. application Ser. No. 15/095,129 filed 10 Apr. 2016, which claims the benefit of US Provisional Application No. 62/186,600 filed 30 Jun. 2015. U.S. application Ser. No. 15/095,129 claims a priority date of 10 Apr. 2015 based on prior filed German patent application No. 10 2015 004 380.3. The entire contents of the aforesaid US Applications, the US Provisional Application and German patent application being incorporated herein by reference to the fullest extent permitted by the law.

TECHNICAL FIELD

The present invention relates to a filter element and a filter arrangement.

BACKGROUND

Known air filters for vehicles can be formed from a filter medium that has been wound or folded onto a central tube. Especially in the field of agricultural vehicles and construction vehicles, the filter medium may become clogged or damaged because of the high dust load. This can reduce the service life and filter efficiency of the air filter. In order to ensure the filter efficiency throughout the service life of the filter element, it is also necessary to reliably seal the filter element from a filter holder.

Patent document WO 2009/106591 A2 describes an air filter having a pre-separator. The pre-separator makes it possible for particles contained in the unfiltered gas to be separated out by means of centrifugal force. This enables an improvement in the filter efficiency, because the particles are separated out from the unfiltered gas before reaching the air filter. The air filter includes an oval sealing device having straight and curved sections.

SUMMARY

Against this background, the present invention addresses the problem of providing an improved filter element.

Accordingly, the present invention proposes a filter element having an oval cross-section in a longitudinal direction thereof. The filter element has a circumferential sealing device for sealing the filter element, in particular, in a radial manner from a filter holder for the filter element, wherein the sealing device has two first curvature sections arranged one facing the other and two second curvature sections arranged one facing the other, wherein the first curvature sections each have a first radius of curvature and the second curvature sections each have a second radius of curvature, and wherein the first radius of curvature differs from the second radius of curvature. A construction of the seal exclusively with two different radii, which are each completely or at least substantially constant over the individual curvature sections, may be advantageous in terms of tool production and quality control.

The second radius of curvature may tend toward infinity, i.e., may even be straight; this is analogously applicable to an oval shape of the filter element. In one embodiment, the sealing device has a substantially stadium-like geometry. It has proven advantageous for the sealing device to have no straight sections but rather only curved sections. This is especially true when the filter element or the filter body formed from a filter medium has an oval cross-section, an outer contour of which has partially straight or slightly curved sections. Having the sealing device include essentially only curved sections makes it possible to achieve a constant contact pressure of the sealing device against an engagement region of the filter holder over the entire circumference of the sealing device.

The sealing device is preferably configured so as to seal off the filter element radially inward with respect to the filter holder. Greater curvatures or smaller radii on the sealing device are more advantageous than lesser curvatures or greater radii when there is radially inward or outward sealing, because as curvature increases, there is a decreased risk that the sealing device will lose contact with a filter holder-side sealing contact surface under vibration loading. The sealing device may alternatively or additionally also be configured so as to axially seal off the filter element with respect to the filter holder. "Inward" presently refers to a direction oriented radially toward a fluid outlet of the filter holder. Preferably, the sealing device is resiliently deformable. The filter element may spatially surround a secondary element. The sealing device preferably circulates entirely around a first end plate of the filter element. Preferably, the filter element is an air filter for filtering intake air for an internal combustion engine. Preferably, the filter element is used in motor vehicles, trucks, construction vehicles, watercraft, rail vehicles, agricultural machinery or vehicles, or aircraft.

According to the idea of the invention, it is advantageous but not required to select a course of the sealing device that is formed, in particular, exclusively of segments of a circle. A substantial advantage arises, namely, from the sealing device having only curved sections, and especially sections curved continuously in one direction so as to result in a continuous convex outer contour without straight or concave sections. The invention therefore also relates somewhat more generally to a filter element having an oval cross-section that is defined by a filter body from a filter medium, with two first curvature sections of greater curvature that face one another and are connected to one another by two second curvature sections that face one another and are less curved than the first curvature sections, the filter element further comprising a oval circumferential sealing device for, in particular, radially sealing off the filter element from a filter holder, wherein the sealing device includes two first curvature sections of greater curvature that are arranged one facing the other and two second curvature sections that are arranged one facing the other and are less curved than the first curvature sections, wherein the second curvature sections of the sealing device are more curved than the second curvature sections of the oval cross-section defined by the filter body. The first curvature sections are preferably connected to one another through the second curvature sections in such a manner that the first and second curvature sections merge into one another, in particular, merge directly into one another, preferably continuously and more preferably smoothly merge into one another. A result thereof is, for example, that in the transition region between the first and second curvature sections, no additional curvature section can be present with a curvature that is greater than the curvature of the two first curvature sections. This is advantageous in that in spite of a non-circular shape, an all-around favorable sealing effect can be ensured. Preferably, the sealing device and/or the filter body and/or at least one of the end plates has/have selected therefor an oval cross-section or course that has a center point and two axes of symmetry that intersect at the center point, and/or has a width-to-height ratio of more than 1.5:1, preferably more than 2:1, more preferably less than 5:1 or 4:1, particularly preferably less than 3:1. Width-to-height ratios of the filter element and/or filter body in the range between 1.5:1 and 3:1 are particularly preferable for a pre-separation effect through centrifugal force. Particularly preferably, the filter body and the sealing device have the same axes of symmetry. Particularly preferably, the filter element has a longitudinal axis of symmetry to which the sealing device and/or the filter body and/or at least one end plate are at least substantially symmetrical. This longitudinal axis of symmetry preferably runs through the point of symmetry of the above-mentioned intersecting axes of symmetry, preferably each being perpendicular thereto. The longitudinal axis of symmetry is preferably coaxial to the central axis of the filter holder and/or the filter element, or may be defined thereby.

It is particularly preferable in all embodiments for the second curvature sections of the sealing device and the second curvature sections of the oval cross-section defined by the filter body to be arranged adjacent to one another i.e., to have substantially the same angular position in relation to the oval shape. The same applies to the first curvature sections of the sealing device—more curved than the second ones—and the cross-section defined by the filter body. In embodiments, centers of curvature of the first radii of curvature are arranged on a first straight line, wherein centers of curvature of the second radii of curvature are arranged on a second straight line, and wherein the first straight line is positioned so as to be perpendicular to the second straight line. Preferably, the second radii of curvature are greater than the first radii of curvature. Preferably, the first radii of curvature are of equal size. Preferably, the second radii of curvature are of equal size.

In further embodiments, the second straight line is arranged centrally between the centers of curvature of the first radii of curvature and/or the first straight line is arranged centrally between the centers of curvature of the second radii of curvature. End points of the straight points are respectively defined by the centers of curvature. Preferably, the first straight line centrally divides the second straight line, and vice versa.

A filter element according to the invention preferably includes a filter body formed of a filter medium. The filter body preferably allows through-flow radially inward from the outside and vice versa. The filter body may preferably be formed by a zigzag-folded, annularly-enclosed filter medium, and have a circular, oval, or elliptical shape. The filter body may additionally be formed from a tube-shaped, in particular, multi-layered winding of a filter medium. Alternatively, the filter body may allow for an axial through-flow, for example, by an, in particular, oval winding made of a semi-finished material having two filter medium layers, a corrugated layer, and a smooth layer, which form mutually locked canals.

In further embodiments, the filter element includes at least one end plate and a filter body connected to the end plate, wherein the sealing device is provided on a front side of the, in particular, open end plate that faces away from the filter body. The end plate is preferably a first end plate of the filter element. Preferably, the filter element has two end plates, between which the filter body is arranged. The sealing device may be formed so as to be materially integral with the first end plate. The second end plate may preferably be closed.

In further embodiments, an outer contour and/or inner contour of the sealing device is arranged so as not to be parallel to an outer contour and/or inner contour of the end plate. Preferably, the outer or inner contour of the sealing device does not follow the outer and/or inner contour of the end plate, i.e., the distance between the outer contour of the sealing device and the outer contour of the end plate is not constant.

Further preferably, the sealing surface, i.e., the surface of contact of the sealing device for the sealing contact against a corresponding sealing contact surface of the housing does not follow the outer contour of the end plate.

For the case of a radial sealing, this generally relates to the radial inner surface of the sealing device, but the radial outer surface of the sealing device may also form the sealing surface.

Particularly preferably, the sealing device—in particular, the inner surface of the seal in the middle of the less-curved curvature sections of the filter body and/or of the sealing device—has a smaller distance to the outer (in particular, radially outer) surface of the filter body and/or the outer contour of an open end plate than in the transitional region between the more- and less-curved curvature sections of the filter body and/or the sealing device. The curvature of the seal in the weakly-curved region of the filter body can thereby be reinforced, and thus optimized in relation to the reliability of the seal under vibrational loading. This has the preferred geometric consequence of it not being possible to construct the curvature of the second curvature sections of the seal even through a scaled enlargement/reduction (central stretching) of the outer contour of the open end plate and/or the filter body. Rather, this preferably means that the curvature of the second curvature sections of the seal is greater than the curvature of a comparable comparison curve, in particular, one that is parallel, in particular, concentric to the outer contour of the filter body and/or open end plate, in particular, one that is obtained from the outer contour by scaling down or runs within the outer contour and parallel thereto, the comparison curve having at least substantially the same distance to the outer contour of the end plate and/or filter body in the center of the second curvature sections of the sealing, outer contour of the end plate, and/or outer contour of the filter body.

In an advantageous embodiment, the sealing device is arranged within an imaginary axial continuation of the outer surface of the filter body and/or the outer contour of an open end plate in the longitudinal direction. This is advantageous in that the sealing device requires no additional space radially to the longitudinal direction, and can be formed directly, e.g., integrally or in a materially-uniform manner with the end plate. If an annularly-closed filter bellows folded in the shape of a zigzag or star made out of a filter medium is used as the filter body, then it may be particularly advantageous for the sealing device to be arranged within a cross-section of the filter body (more precisely, within an imaginary axial continuation of the cross-section in the longitudinal direction). This is advantageous in that the cross-section of the outflow path from the filter element is not unnecessarily reduced by the sealing device, whereby the flow resistance would be increased.

In further embodiments, the filter element includes an inflow protector wrapping around the filter body at least in some sections. The inflow protector prevents particles contained in the fluid to be filtered, such as small stones, from directly striking the filter medium. Damage to the filter medium is thereby prevented. This increases the service life of the filter element.

In further embodiments, the inflow protector is adhered, welded, or fused to the filter body. The inflow protector alternatively rests flush and preferably loose on the filter medium, in particular, on the folding edges of the filter medium. In particular, the inflow protector is arranged adjacent to a first end plate of the filter element. The inflow protector may be connected to the first end plate, for example, may be enclosed in a partially positively-locked manner by the material thereof. This makes it possible to securely connect the inflow protector to the filter body, by means of the end plate material, in particular, polyurethane or polyurethane foam.

In further embodiments, the inflow protector is fluid-tight. The inflow protector may be a foil. Alternatively, the inflow protector may be fluid-permeable. For example, the inflow protector may be made from a fine mesh or grid. Preferably, the inflow protector is made from a plastic material.

The inflow protector preferably goes completely around the filter body at least once, in particular, in an annular-enclosed manner. This makes it possible to ensure that a filter element, which can be installed in two positions due to the symmetry, is protected in both positions from a frontal inflow through a fluid inlet, and that in both possible installation positions, it is possible in the same manner to form a pre-filtration fluid flow rotating about the filter element, which is important for the pre-separation. Then, the inflow protector should preferably extend over the filter body, preferably completely but at least radially from the first end plate in the regions that can be exposed to a direct inflow, so broadly that the axial extension of the fluid inlet of a filter housing is covered. This is the case, depending on the design of the filter system, if the inflow protector extends over at least 15, 20, or 25% of the axial length of the filter body and/or maximally 80, 70, 60, 50, 40, or 30% of the axial length of the filter body.

The invention also proposes a filter arrangement having such a filter holder and such a filter element, which is held in a holding section of the filter holder.

In embodiments, the holding section includes an engagement region with which a circumferential sealing device of the filter element engages, wherein the sealing device rests with an inner surface against the engagement region. The engagement region is preferably provided so as to encircle a fluid outlet of the filter holder. The sealing device preferably rests against the engagement region on the inside.

The invention also proposes a filter holder for a filter element that has an oval cross-section across a longitudinal direction thereof. The filter holder includes a holding section for holding the filter element, a fluid inlet for allowing a fluid to be filtered to flow into the filter holder, and a fluid outlet for allowing the fluid, having been filtered by the filter element, to flow out from the filter holder, wherein the fluid inlet is arranged such that an inflow direction of the fluid to be filtered is oriented in the direction of an outer surface of the filter element, which can be held in the holding section, so that the fluid to be filtered flows tangentially through the filter element that can be held in the holding section, in order to separate particles contained in the fluid to be filtered out by centrifugal force at a wall of the holding section. The filter holder may also be referred to as a housing or a filter housing.

Orienting the inflow direction in the direction toward the filter element causes the flow against the filter element to be more direct in comparison to known arrangements. Because the filter holder itself acts as a pre-separator, in particular, as a centrifugal force separator, it is possible to forgo additional pre-separators that have been arranged upstream of the filter element. This results in a cost advantage over known arrangements. The, in particular, oval cross-sectional shape of the holding section leads to a better degree of pre-separation of the particles in comparison to a circular cross-sectional shape. Even narrow or rectangular spaces can be used for the holding of the filter holder with the same structural volume, due to the oval cross-sectional shape. In particular, the filter holder is arranged such that a width direction of the holding section is positioned horizontally. Preferably, the inflow direction of the fluid to be filtered is oriented such that the fluid strikes directly against a curvature of the wall of the holding section. This greatly accelerates the fluid. So doing leads to a better degree of pre-separation in comparison to a holding section having a circular cross-section. "Oval" may presently refer to a rectangular shape having rounded corners, an at least approximately elliptical shape, or a shape formed of a plurality of curvature sections or segments of a circle. Both for the filter holder as well as for the filter elements to be held and/or the sealing device(s) thereof, it is presently preferable to have an oval shape having two axes of symmetry, which intersect, in particular, orthogonally at a center point, through which a central axis of the filter holder and/or filter element(s) passes perpendicularly to the two axes of symmetry. Elliptical shapes can also be produced through approximate constructions of ellipses, such as, for example, via curvature circles or according to de la Hire. Preferably, the holding section includes a first and second housing part, which can be connected to one another with the aid of fastening means. The housing parts may be made out of a plastic material. Preferably, the housing parts are plastic injection-molded components. The housing parts may alternatively also be made out of sheet metal. The holding section may also be integrally formed. This means that the housing parts may be integrally connected to one another. The particles may be, for example, sand, dust, plant parts, or the like.

In embodiments, the inflow direction of the fluid to be filtered is oriented perpendicularly to the longitudinal direction of the filter element that can be held in the holding section. This causes the fluid to be filtered to flow partially in the space between the holding section and the filter element, as well as—optionally—at least partially also directly to the filter element, through which the flow is preferably helical. In further embodiments, the holding section is configured so as to hold the filter element centrally in the holding section with respect to a longitudinal direction thereof.

A second end plate of the filter element may include bracing elements with the aid of which the filter element can be optimally positioned in the holding section. The elastically deformable bracing elements are also used for vibration damping and/or tolerance compensation.

In further embodiments, the holding section is configured so as to hold the filter element so as to provide a constant distance between the filter element and the wall of the holding section perpendicularly to the outer surface of the filter element and/or perpendicularly to the inner wall of the holding section, circumferentially about the filter element.

The distance is preferably substantially or completely constant over the longitudinal direction, but may also vary in the longitudinal direction. For example, the distance may increase or decrease in the longitudinal direction. For this purpose, the filter element may be, for example, taper conically in the longitudinal direction in or against the outflow direction.

The filter element may taper conically in the longitudinal direction.

In further embodiments, the holding section has in the cross-section a width direction and a height direction, which preferably coincide with the axes of symmetry of the oval shape, wherein the fluid inlet is configured such that the inflow direction of the fluid is arranged perpendicularly to the width direction.

Preferably, the fluid inlet is arranged laterally on the holding section so that the in-flowing fluid strikes against the wall of the holding section.

In further embodiments, then, an expansion of the holding section in the width direction is greater than in the height direction. For example, the holding section is at least 1.5 times—preferably, two to three times—wider than tall. Preferably, then, the width-to-height ratio of the filter element provided for being held in the holding section is greater than the width-to-height ratio of the holding section. Further preferably, a suitable filter element has so similar a height-to-width ratio and, in particular, a shape such that a constant distance between the filter element and the wall of the holding section is provided perpendicularly to the outer surface of the filter element and/or perpendicularly to the inner wall of the holding section, circumferentially about the filter element.

In further embodiments, the fluid inlet has an oval cross-section having a greater diameter parallel to the longitudinal axis of the filter holder than perpendicular to the longitudinal axis. This makes it possible to achieve a lower pressure loss when the fluid to be filtered flows into the fluid inlet. Alternatively, the fluid inlet may have a circular cross-section.

In further embodiments, the filter holder includes a detachable maintenance cover having a particle discharge opening.

The maintenance cover is preferably a plastic injection-molded component. The maintenance cover may also be made from sheet metal. The maintenance cover may be fastened to the holding section with quick-action fasteners. The particle discharge opening may have a valve.

In further embodiments, the maintenance cover has a tube-shaped, in particular, oval tube-shaped inflow protector, which, in particular, projects into the interior of the filter holder and in which the filter element can be held at least partially and preferably coaxially. The inflow protector is preferably materially integral with the maintenance cover. The length of the inflow protector is preferably designed so that the inflow protector surrounds the filter element over about 15 to 50%, preferably 20 to 40% of the total length thereof in the longitudinal direction, starting from the closed end plate, i.e., the length of the inflow protector in the longitudinal direction is about 15 to 50%, preferably 20 to 40% of the length of the filter element.

The invention further proposes a filter element that has an oval cross-section across a longitudinal direction thereof.

The filter element includes a first end plate, a second end plate, and a filter body arranged between the first end plate and the second end plate, wherein the filter element may include an inflow protector that at least partially covers the filter body. The filter element may have features both that have already been set forth and that will be set forth, or that are set forth in the claims.

The inflow protector may also be provided in the holding section. The inflow protector prevents particles contained in the fluid to be filtered—e.g., sand—from directly striking against the filter medium. Damage to the filter medium is thereby prevented. This increases the service life of the filter element. Preferably, the filter element is an air filter for filtering intake air for an internal combustion engine. Preferably, the filter element is used in motor vehicles, trucks, construction vehicles, watercraft, rail vehicles, agricultural machinery or vehicles, or aircraft. The filter medium is preferably folded in the shape of a zigzag. The filter medium is, for example, a filter paper, a filter fabric, a filter cloth, or a non-woven filter web. In particular, the filter medium can be produced in a spunbonded web or meltblown process. The filter medium may also be felted or needle-punched. The filter medium may include natural fibers—such as cellulose or cotton—or synthetic fibers—such as polyester, polyvinyl sulfite, or polytetrafluoroethylene. The fibers, when processed, may be oriented in, oblique to, or transverse to the machine direction, or unordered. The filter medium may be fused, adhered, or welded to the end plates. In embodiments, the inflow protector is adhered, welded, or fused to the filter body formed from the filter medium.

The inflow protector alternatively rests flush and preferably loose on the filter medium, in particular, on the folding edges of the filter medium. In particular, the inflow protector is arranged adjacent to a first end plate of the filter element.

The inflow protector may be connected to the first end plate, for example, may be enclosed in a partially positively-locked manner by the material thereof.

In further embodiments, the inflow protector is fluid-tight. The inflow protector may be a foil. Alternatively, the inflow protector may be fluid-permeable. For example, the inflow protector may be made from a fine mesh or grid. Preferably, the inflow protector is made from a plastic material.

In further embodiments, the filter element surrounds a secondary element that can also be held in the filter holder. The filter element may also be referred to as a first filter element, and the secondary element may also be referred to as a second filter element. The first end plate of the filter element preferably includes a receiving opening into which the secondary element can be inserted. This receiving opening, at the same time, preferably constitutes the outflow cross-section of the first filter element.

In further embodiments, the filter element includes a sealing device provided at the—preferably open—first end plate, wherein the sealing device is designed so as to, in particular, radially or axially seal off the filter element from the filter holder, in such a manner that the inflow side or pre-filtration side of the filter element is separated from the outflow side or post-filtration side. Preferably, the sealing device is configured so as to be materially integral with the first end plate. In particular, the first end plate and the sealing device may be produced from an, in particular, molded polyurethane material, in particular, a foamed polyurethane material. The sealing device is preferably resiliently deformable. The sealing device is preferably designed so as to seal the filter element off from the filter holder radially inward, i.e., in the direction toward a fluid outlet of the filter holder, and preferably includes for this purpose an, in particular, oval sealing surface that is inwardly directed and annularly-enclosed. The sealing device may also be designed to seal the filter element off axially against the filter holder.

The invention further proposes a filter arrangement having such a filter holder and such a filter element held in a holding section of the filter holder, wherein a fluid inlet of the filter holder is arranged such that an inflow direction of the fluid to be filtered is oriented in the direction of an outer surface of the filter element held in the holding section, such that the fluid to be filtered flows through the filter element held in the holding section tangentially and/or helically, in particular, ovally helically, in order to separate particles contained in the fluid to be filtered with the aid of centrifugal force at a wall of the holding section.

Preferably, the inflow direction of the fluid to be filtered is oriented such that the fluid strikes directly against a curvature of the wall of the holding section. This greatly accelerates the fluid, whereby the centrifugal forces acting on the fluid are increased. This is beneficial for the degree of pre-separation of the particles. The filter arrangement may also be referred to as a two-stage filter, wherein the first stage is formed by the centrifugal separation and the second stage is formed by a filter element.

The invention further proposes a filter holder for a filter element, in particular, one according to the invention, which has an oval cross-section across a longitudinal section thereof. The filter holder includes a holding section for holding the filter element, a fluid inlet for allowing a fluid to be filtered to flow into the filter holder, and a fluid outlet for allowing the fluid, having been filtered by the filter element, to flow out from the filter holder, wherein the fluid inlet is arranged such that an inflow direction of the fluid to be filtered into the fluid inlet is oriented parallel to the longitudinal direction of the filter element, wherein the fluid inlet includes a guide element that is designed to divert the fluid to be filtered at the inflow into the fluid inlet in such a manner that the fluid flows helically through the filter element that can be held in the holding section, in order to separate particles contained in the fluid to be filtered out by centrifugal force at a wall of the holding section.

The guide element may be a guide blade. Having the fluid to be filtered flow helically through the filter element causes the filter holder to act as a pre-separator for separating out the particles. This makes it possible to forgo having to add a pre-separator. The filter holder can thereby be produced in an especially economical manner. The filter holder preferably has an oval cross-section. The preferably oval cross-sectional shape of the holding section leads to a better degree of pre-separation of the particles in comparison to a circular cross-sectional shape. Even narrow or rectangular spaces can be used for the holding of the filter holder, due to the oval cross-sectional shape. In particular, the filter holder is arranged such that a width direction of the holding section is positioned horizontally. Preferably, the holding section includes a first and second housing part, which can be connected to one another with the aid of fastening means. The housing parts may be made from a plastic material or a metallic material. Preferably, the housing parts are plastic injection-molded components. The holding section may also be integrally formed. This means that the housing parts form one component. Preferably, the maintenance cover can be removed from the holding section.

In embodiments, the filter holder includes a plurality of fluid inlets. Each of the fluid inlets includes at least one guide element. The guide elements are preferably configured as guide blades.

In further embodiments, the fluid inlets are arranged so as to be distributed evenly over a circumference of the filter holder. Preferably, the fluid inlets are arranged so as to be evenly spaced apart from one another. Alternatively, the fluid inlets may be arranged so as to be unevenly distributed.

In further embodiments, respective angles of curvature of the guide elements vary over a circumference of the filter holder. Each of the guide elements preferably includes a first section that is oriented so as to be parallel to the inflow direction, and a second section that is oriented so as to be oblique to the inflow direction. The sections are arranged so as to be inclined relative to one another in the angle of curvature. The guide elements may all have the same angle of curvature. Alternatively, the guide elements may have different angles of curvature. For example, the angles of curvature may vary over the circumference of the filter holder.

In further embodiments, an inflow cross-section of each of the fluid inlets varies over a circumference of the filter holder. The inflow cross-section may be, for example, rectangular or round. The degree of pre-separation may be optimized through the variation of the inflow cross-sections.

In further embodiments, the fluid inlet is arranged on a maintenance cover that can be removed from the filter holder. Preferably, the fluid inlet is an opening in the maintenance cover.

The maintenance cover preferably also includes the guide elements. The guide elements are, in particular, configured so as to be materially integral with the maintenance cover. The maintenance cover may be fastened to the filter holder with the aid of quick-action fasteners.

In further embodiments, the guide element is positioned so as to be arranged next to the filter element in the longitudinal direction thereof. Preferably, a plurality of guide elements are arranged around the filter element. This enables optimal utilization of the space of the filter element that is available for the filter holder. The length of the filter element can thus correspond approximately to the length of the filter holder.

In further embodiments, the filter holder includes a tubular inflow protector in which the filter element can be at least partially arranged. The inflow protector or the inflow frame is preferably fluid-tight.

In further embodiments, the inflow protector is materially integral with a maintenance cover of the filter holder and/or with the filter holder. The maintenance cover is preferably an inexpensive plastic injection-molded component.

The maintenance cover may also be made from sheet metal.

The invention further proposes a filter arrangement having such a filter holder and a filter element, which is held in a holding section of the filter holder.

The invention further proposes a filter holder for a filter element, in particular, one according to the invention, which has an oval cross-section across a longitudinal section thereof. The filter holder includes a holding section for holding the filter element, a fluid inlet for allowing a fluid to be filtered to flow into the filter holder, and a fluid outlet for allowing the fluid, having been filtered by the filter element, to flow out from the filter holder, wherein the fluid outlet is arranged such that an outflow direction of the filtered fluid from the fluid outlet is oriented parallel to the longitudinal direction of the filter element, and wherein the fluid outlet has a circular cross-section when facing away from the filter element and an oval cross-section when facing toward the filter element.

This reduces a loss of pressure at the outflow of the filtered fluid. This increases the efficiency of a filter arrangement having such a filter holder. Preferably, the oval cross-section has a smaller height than the diameter of the circular cross-section.

In embodiments, the circular cross-section and the oval cross-section of the fluid outlet have an equal cross-sectional area. This allows the filtered fluid to flow out freely. The oval cross-section may also have a greater cross-sectional area than the circular cross-section.

In further embodiments, the fluid outlet has a curved transition section that connects the circular cross-section of the fluid outlet to the oval cross-section of the fluid outlet.

The transition cross-section is preferably curved in the shape of an "S".

In further embodiments, the fluid inlet expands in a width direction of the filter element from the circular cross-section into the oval cross-section. Preferably, a width of the oval cross-section is greater than a diameter of the circular cross-section.

In further embodiments, the fluid inlet tightens in a height direction of the filter element from the circular cross-section into the oval cross-section. Preferably, a height of the oval cross-section is smaller than a diameter of the circular cross-section.

In further embodiments, the filter holder includes a tubular inflow protector, in which the filter element can be at least partially held. The inflow protector or the inflow frame is preferably fluid-tight.

In further embodiments, the inflow protector is integral with a maintenance cover that can be removed from the filter holder. The maintenance cover is preferably an inexpensive plastic injection-molded component. Alternatively, the maintenance cover may be made from, for example, sheet metal—in particular, sheet steel.

The invention further proposes a filter element that has an oval cross-section across a longitudinal direction thereof.

The filter element includes a first end plate, a second end plate, and a filter body arranged between the first end plate and the second end plate, wherein a cross-section of the filter body at the second end plate is greater than a cross-section of the filter medium at the first end plate. The filter element may have one or more of the features that have already been set forth or that will be set forth, or that are set forth in the claims.

Preferably, the filter body tapers conically on the inside. This enables a larger fluid exit opening of the filter element in comparison to a non-conically tapered filter body. The transition section of the fluid outlet can thus be optimized, because the height of the oval cross-section of the fluid outlet can be approximated to the diameter of the circular cross-section of the fluid outlet. This leads to a further reduction in pressure loss. Preferably, the filter element is an air filter element for filtering intake air for an internal combustion engine. Preferably, the filter element is used in motor vehicles, trucks, construction vehicles, watercraft, rail vehicles, agricultural machinery or vehicles, or aircraft.

In embodiments, the cross-section of the filter body increases continuously from the first end plate toward the second end plate. The filter element may surround a secondary element that can be held in the filter holder. The secondary element may have a conical or truncated-cone shape, corresponding to the filter body of the first filter element.

The invention also proposes a filter arrangement having such a filter holder and such a filter element and/or secondary element, which can be held in a holding section of the filter holder.

Other possible implementations of the invention include combinations (even those not explicitly mentioned) of features or process steps that have been or will be described in relation to the embodiments. A person skilled in the art will then also add individual aspects as improvements or supplementations to the basic form of the invention.

Further refinements of the invention are the subject matter of the sub-claims as well as the embodiments of the invention that are described hereinafter. In addition, the invention shall be described in further detail through embodiments with reference to the accompanying drawings.

BRIEF DESCRIPTION OF THE DRAWINGS

In the drawings, identical or functionally-identical elements—unless otherwise specified—have been provided with identical reference signs.

DETAILED DESCRIPTION

Figure 1:
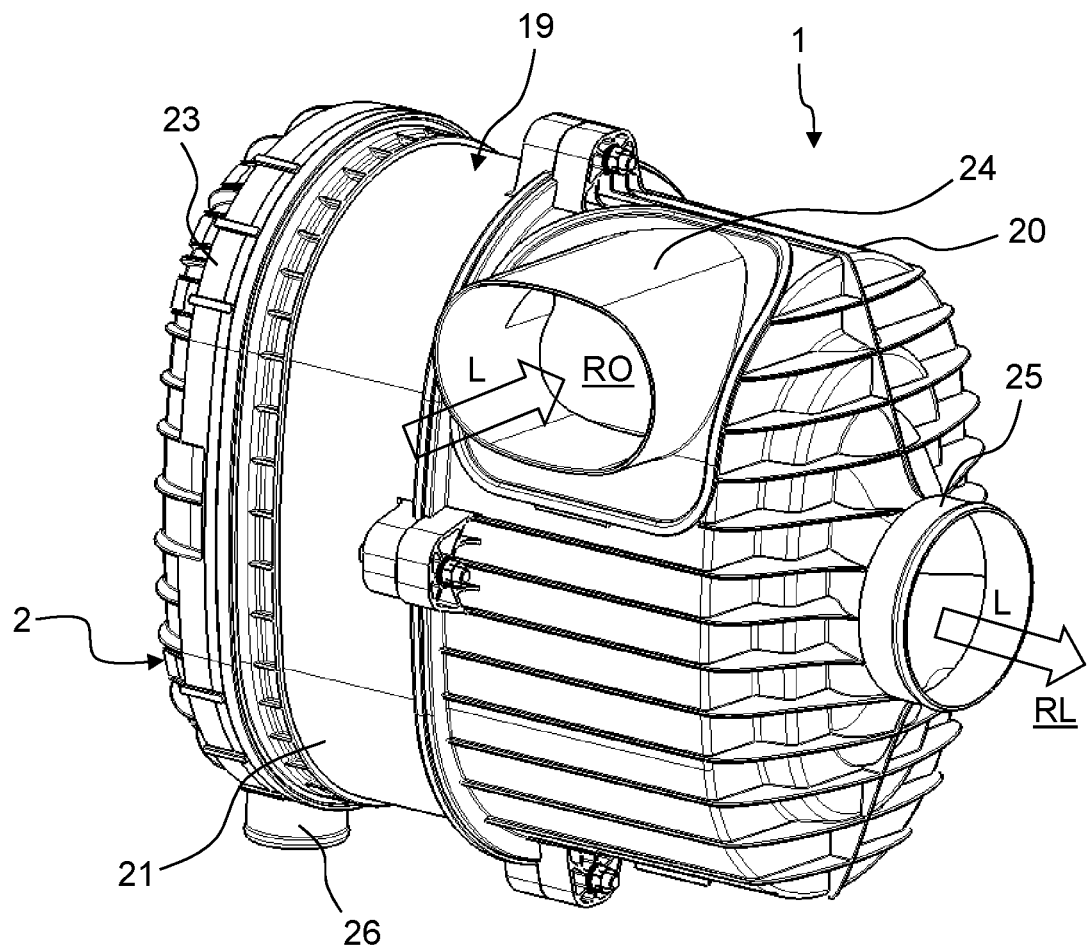
FIG. 1 illustrates a schematic perspective view of one embodiment of a filter arrangement.
Figure 2:
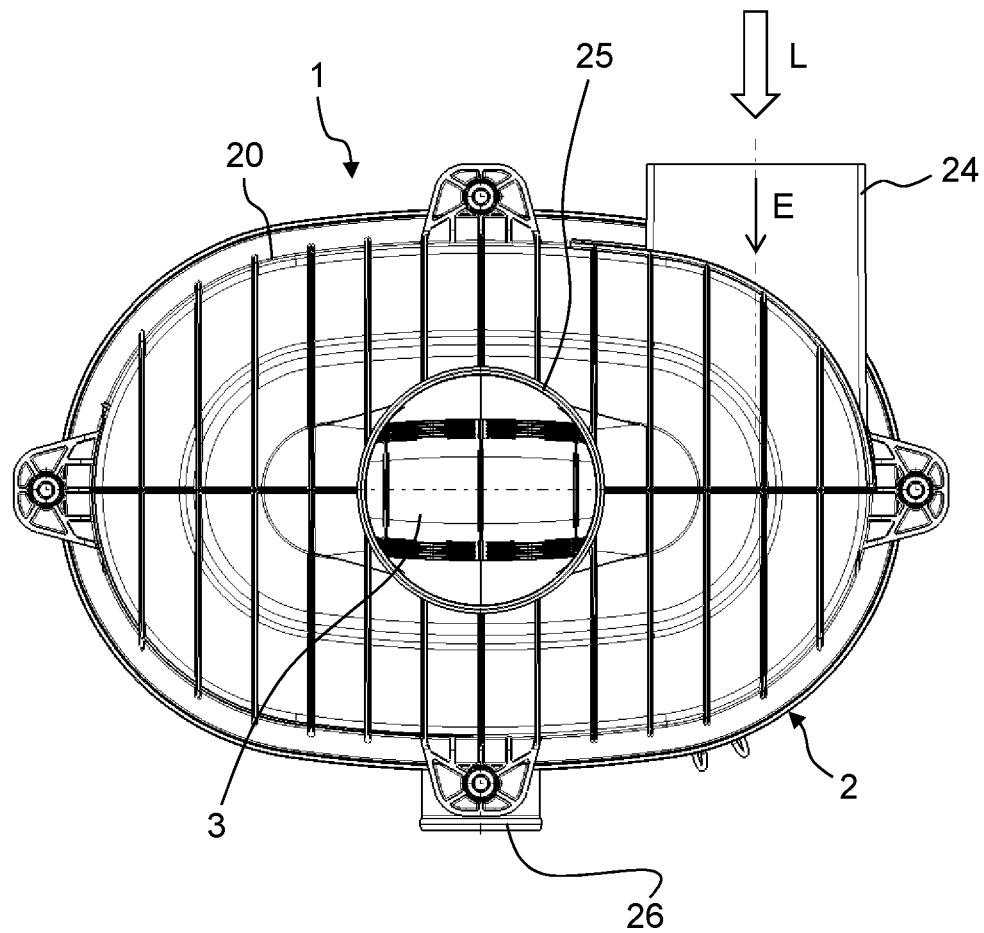
FIG. 2 illustrates a schematic view of the filter arrangement according to FIG. 1.
Figure 3:
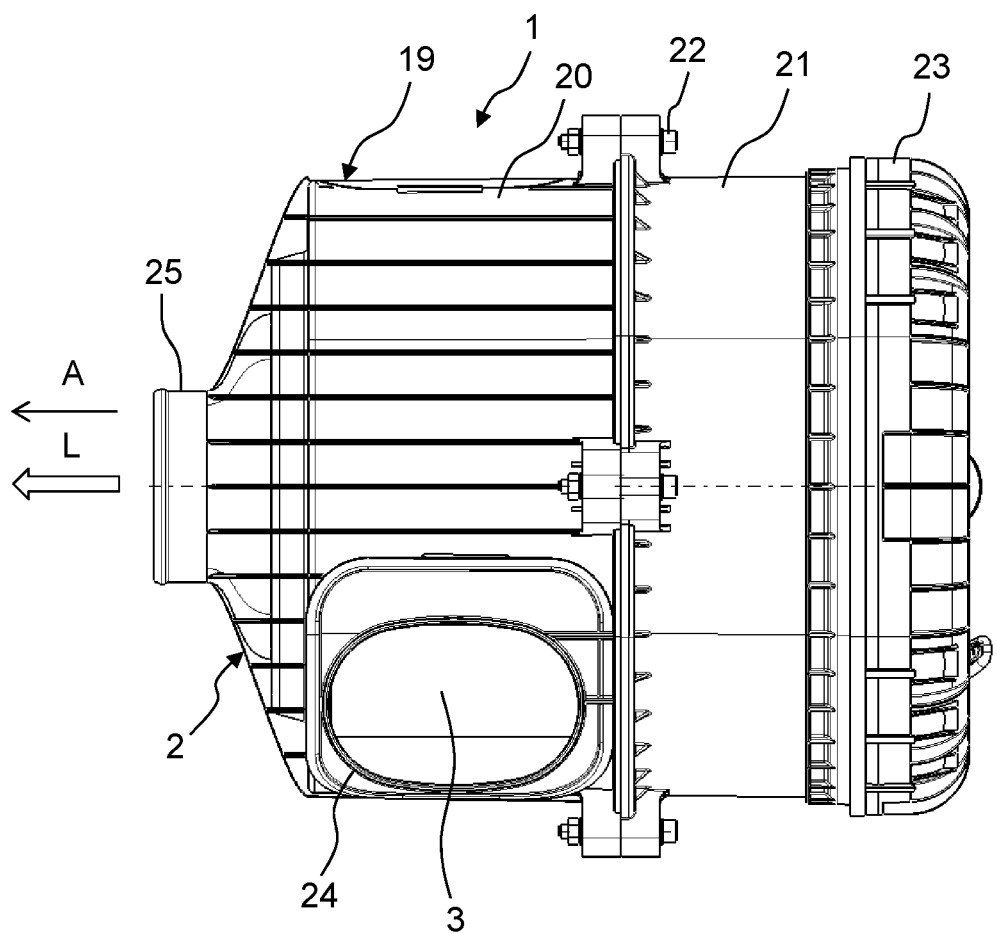
FIG. 3 illustrates a schematic view of the filter arrangement according to FIG. 1.
Figure 4:
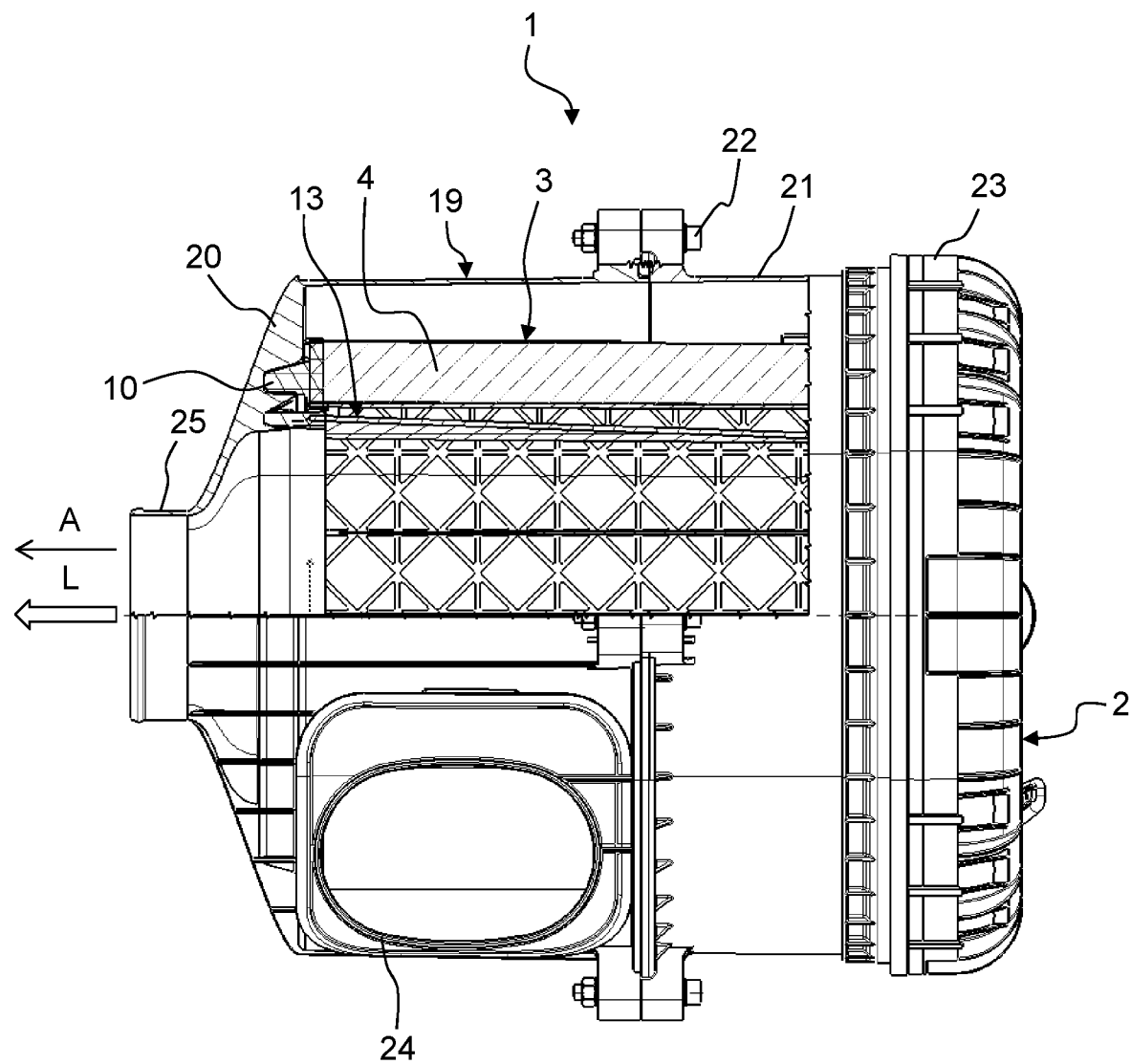
FIG. 4 illustrates schematic partial sectional view of the filter arrangement according to FIG. 1.
Figure 5:
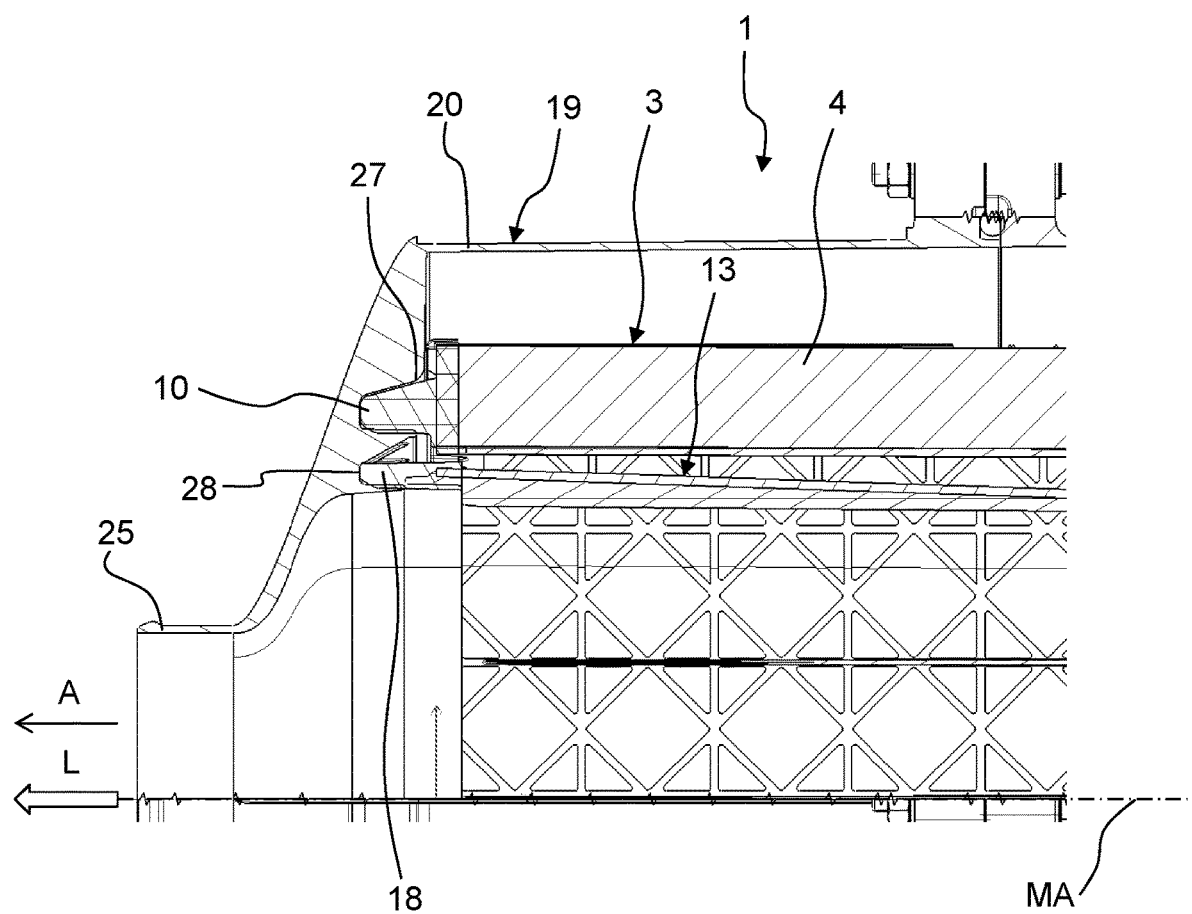
FIG. 5 illustrates schematic partial sectional view of the filter arrangement according to FIG. 1.

FIG. 1 illustrates a schematic perspective view of one embodiment of a filter arrangement 1. FIG. 2 illustrates a front view of the filter arrangement 1. FIG. 3 illustrates a side view of the filter arrangement 1. FIGS. 4 and 5 each show a partial sectional view of the filter arrangement 1.

Figure 6:
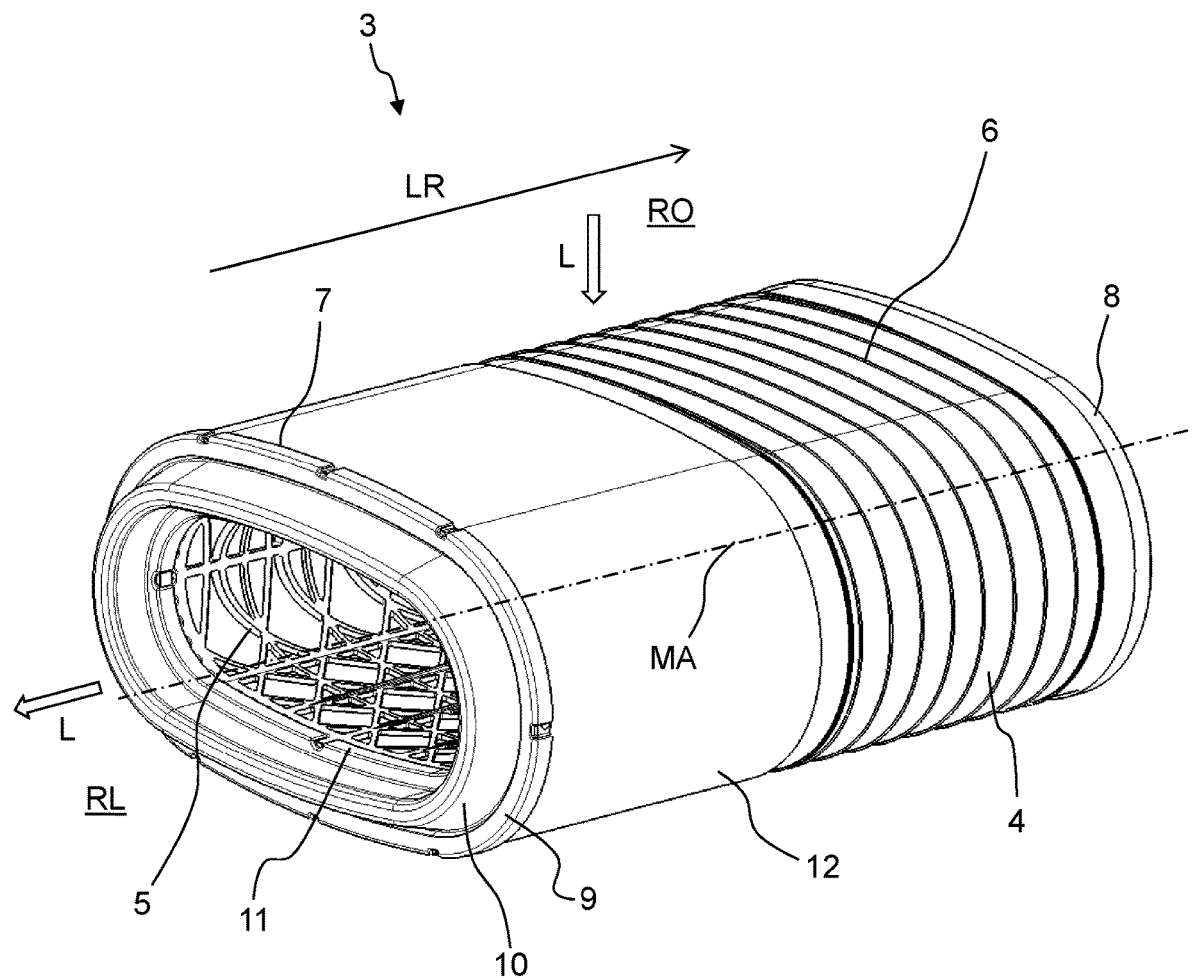
FIG. 6 illustrates a schematic perspective view of one embodiment of a filter element.

The filter arrangement 1 includes a filter holder 2, and a filter element 3 that is arranged in the filter holder 2. The filter holder 2 may also be referred to as a housing or filter housing. The filter element 3 is depicted in FIG. 6. The filter arrangement 1 is preferably used as an intake air filter for internal combustion engines, e.g. in motor vehicles, trucks, construction vehicles, watercraft, rail vehicles, agricultural machinery or vehicles, or aircraft. The filter element 3 is particularly suitable for filtering combustion air of an internal combustion engine. Preferably, the filter element 3 is an air filter element. The filter element 3—which may also be referred to as a primary element or main element—includes a filter body 4 that surrounds a central tube 5 and preferably rests thereagainst in such a manner that the central tube 5 can be perceived as having a support function for the filter body 4 when there is a flow therethrough. For example, the filter body 4 may be wound around the central tube 5 as a wrap made of a filter medium, or may rest thereagainst in an annularly-enclosed manner, for example, in the form of a star-shaped folded bellows. The central tube 5 is preferably in the shape of a grid and therefore fluid-permeable. The filter body 4 is preferably folded. For the purpose of stabilization, the folded filter medium can be wrapped around with a thread winding 6, i.e., a strip soaked in a hot melt adhesive or other adhesive, or can be fixed by means of a circularly- or helically-encircling adhesive beads. The filter medium is, for example, a filter paper, a filter fabric, a filter cloth, or a non-woven filter web. In particular, the filter medium can be produced in a spunbonded web or meltblown process, or can include such a fiber layer that has been applied to a spunbonded web or cellulose support. The filter medium may also be felted or needle-punched. The filter medium may include natural fibers—such as cellulose or cotton—or synthetic fibers—such as polyester, polyvinyl sulfate, or polytetrafluoroethylene. The fibers, when processed, may be oriented in, oblique to, or transverse to the machine direction, or unordered.

The filter element 3 includes a first, in particular, open end plate 7 and a second, in particular, closed end plate 8. The end plates 7, 8 are preferably made from a plastic material. For example, the end plates 7, 8 may be configured as inexpensive plastic injection-molded components. The end plates 7, 8 may be produced, for example, from a polyurethane material, especially one that is molded in casting shells, and preferably one that is foamed. The end plates 7, 8 may be cast onto the filter body 4. The filter body 4 is arranged between the end plates 7, 8. A sealing device 10 for sealing the filter element 3 off from the filter holder 2 is provided on a front side 9 of the first end plate 7 that faces away from the filter body 4. The sealing device 10 is designed to seal the filter element 3 off from the filter holder 2, in particular, in a radial manner.

The filter medium of the filter body 4 may be fused, adhered, or welded to the end plates 7, 8. The second end plate 8 is, for example, plate-shaped and preferably fluid-impermeable. Provided in the first end plate 7 is a receiving opening 11 through which the air that has been filtered by the filter element 3 can continue to escape. The filter element 3 preferably further includes an inflow protector 12 that prevents a particle-laden fluid L from directly flowing into the filter medium 4. The fluid L may be air. The inflow protector 12 may be a foil, a small-meshed net, or a grid. The inflow protector 12 may be fluid-impermeable or fluid-permeable. The inflow protector 12 may be adhered, welded, or fused to the filter body 4. The inflow protector 12 is arranged adjacent to the first end plate 7. In particular, the inflow protector 12 borders on the first end plate 7. The inflow protector 12 may be connected to the first end plate 7, in particular, in a flow-sealed manner. Fluid L to be purified enters from a pre-filtration side RO of the filter element 3 through the filter body 4 into a cavity surrounded by the central tube 5, and flows therefrom through the receiving opening 11 as filtered fluid L to a post-filtration side RL of the filter element 3 that is surrounded, in particular, by the filter body 4.

Figure 10:
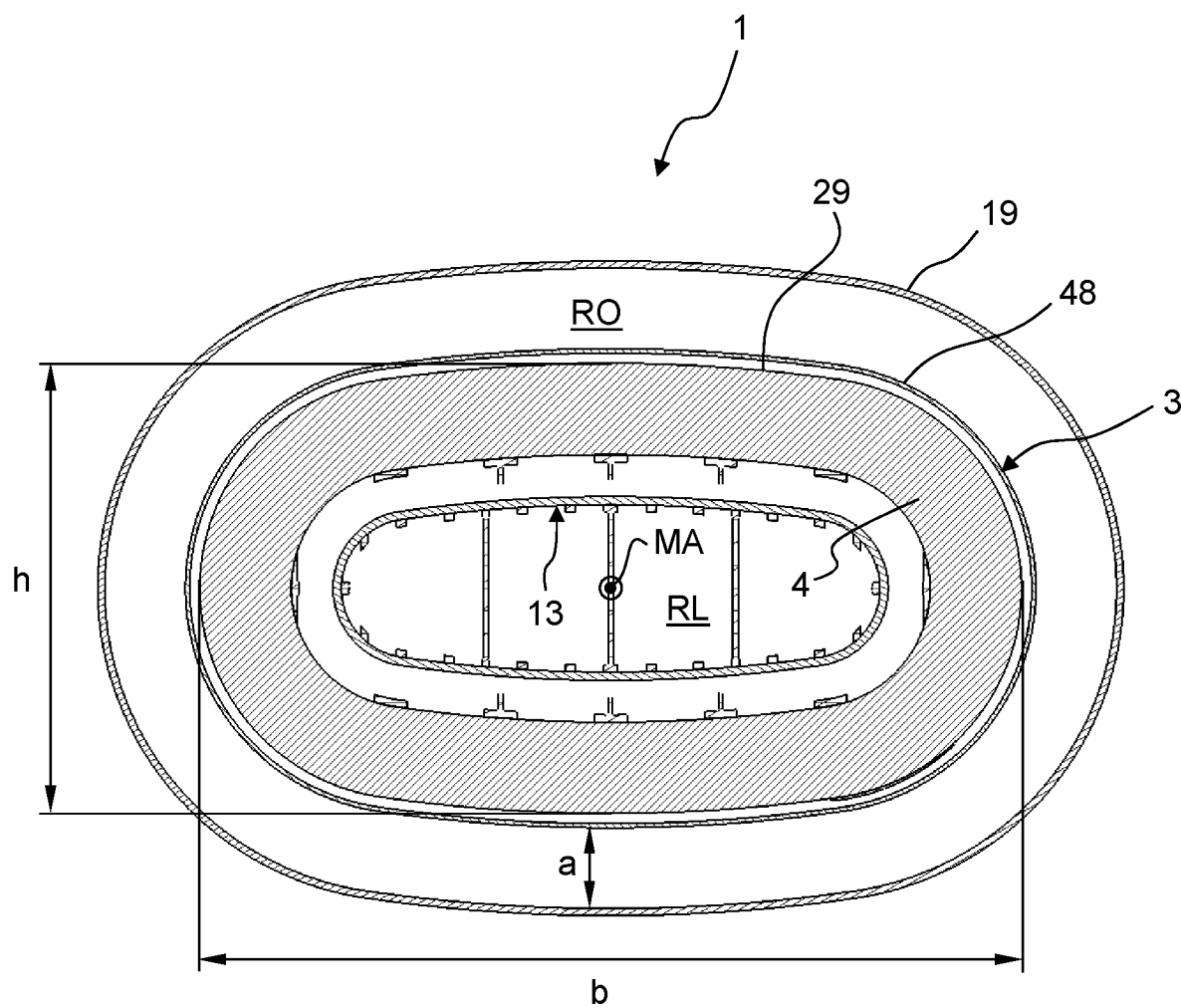
FIG. 10 illustrates a schematic sectional view of the filter arrangement taken along the line X-X in FIG. 8.

The filter element 3 has, preferably, an oval cross-section in a longitudinal direction LR thereof. The cross-section may decrease from the first end plate 7 toward the second end plate 8, such that the filter element 3 tapers conically. However, the filter element 3 preferably has an oval cross-section such as is illustrated in FIG. 6. This means that the filter element 3 is in the shape of a cylinder, with an oval base area. "Oval" may presently be understood to mean a shape that has a smooth, non-concave outer contour, i.e., continuously formed of convex and straight sections, preferably exclusively formed of convex sections; for example, a rectangular cross-section having rounded corners, an elliptical cross-section, or a cross-section formed of a plurality of arcs. It is preferable to use an oval outer contour or cross-section having a center point and two axes of symmetry intersecting at the center point. The filter element 3 and, in particular, the filter body 4 have a width b and a height h (FIG. 10). The width b is greater than the height h. Preferably, the width b is two to three times the height h; more preferably, the width b is 1.5 to three times the height h.

Figure 7:
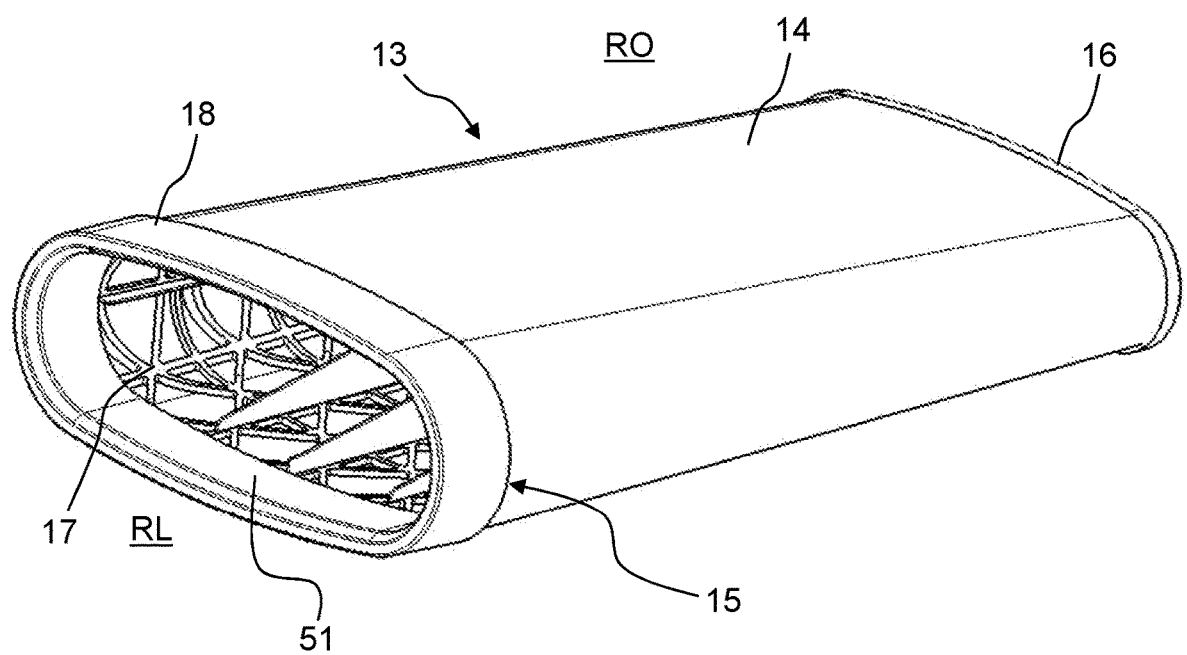
FIG. 7 illustrates a schematic perspective view of one embodiment of a secondary element.

In the filter holder 2, surrounded by the filter element 3, a secondary element 13 illustrated in FIG. 7 may be held. Such secondary elements are used, in particular, as a security for instances where an operator opens the filter holder 2 while a machine is running and removes the filter element 3, e.g., in order to remove dust from or replace same. In particular, the filter element 3 may be referred to as a first filter element and the secondary element 13 may be referred to as a second filter element. Preferably, the secondary element 13 is held in the receiving opening 11. The secondary element 13 includes a filter medium 14 as well as a first end plate 15 and a second end plate 16. The filter medium 14 is arranged between the end plates 15, 16. The filter medium 14 surrounds a grid-shaped central tube 17. The secondary element 13 has, like the filter element 3, a pre-filtration side RO and a post-filtration side RL. The first end plate 15 may include a sealing device 18 for sealing the secondary element 13 off from the filter holder 2. The sealing device 18 may be formed so as to be materially integral with the first end plate 15. The filter element 3 and the secondary element 13 can be held in the filter holder 2. The secondary element 13 includes a fluid outflow opening 51. The fluid outflow opening 51 may be referred to as a fluid outflow opening of the filter element 3.

As illustrated in FIGS. 1 to 5, the filter holder 2 includes a holding section 19. The holding section 19 may be formed of a first housing part 20 and a second housing part 21. The housing parts 20, 21 may be connected to one another with fastening means 22, such as, for example, with bolts. The housing parts 20, 21 are preferably made out of a plastic material. Alternatively, the housing parts 20, 21 may be made from sheet metal, in particular, sheet steel. For example, the housing part 20, 21 may be configured as inexpensive injection-molded components. A sealing device, such as, for example, an O-ring can be provided between the housing parts 20, 21. Alternatively, the holding section 19 may be integrally formed. This means that the housing parts 20, 21 form an integral component.

The filter holder 2 further includes a maintenance cover 23 that can be removed from the holding section 19. The filter element 3 can be removed from the holding section 19 via the maintenance cover 23. The maintenance cover 23 can be connected to the holding section 19 with the aid of quick-action fasteners. A sealing device may be provided between the maintenance cover 23 and the holding section 19 FIGS. 2 and 3 illustrate the filter arrangement 1 in two different assembly situations, namely, in one lying and one standing.

The filter holder 2 or the holding section 19 includes a fluid inlet 24 for allowing the fluid L to be filtered to flow into the filter holder 2, and an, in particular, central fluid outlet 25 for allowing the fluid L, having been filtered with the aid of the filter element 3, to flow out from the filter holder 2. The fluid inlet 24 and the fluid outlet 25 are preferably configured so as to be tubular in shape. The fluid inlet 24 may have an oval cross-section, as illustrated in FIGS. 1, 3, and 4. With the aid of the oval cross-section—the wide expansion of which is preferably oriented in the direction of the longitudinal direction LR—it is possible to achieve a lower initial pressure loss as compared to a circular cross-section. The fluid L to be filtered enters the fluid inlet 24 in an inflow direction E. The fluid outlet 25 preferably has a circular cross-section. The fluid L exits from the fluid outlet 25 in an outflow direction A, preferably parallel to the longitudinal direction LR of the filter element 3. The inflow direction E is oriented so as to be perpendicular to the outflow direction A.

A particle discharge opening 26 may be provided on the maintenance cover 23. The particle discharge opening 26 is preferably tubular in shape. Particles that have been pre-separated from the fluid L can be guided away from the filter holder 2 via the particle discharge opening 26. The particle discharge opening 26 may include a valve. The housing parts 20, 21 and/or the maintenance cover 23 may be reinforced with ribs.

Provided in the filter holder 2—in particular, in the holding section 19—is a first engagement region 27 (FIG. 5), with which the sealing device 10 of the filter element 3 engages. This engagement region 27 preferably has a sealing contact surface against which the sealing device 10 can be in sealing contact. In the present embodiment, as preferably illustrated, there is provided a radially outwardly-facing sealing contact surface of an oval cylinder shape, which follows the course of the inner surface 43 (sealing surface) of the sealing device 10. A second engagement region 28, with which the sealing device 18 of the secondary element 13 engages, may also be provided on the holding section 19. This second engagement region 28 preferably also includes a sealing contact surface 280 (see FIG. 32), against which the sealing device 18 can come into sealing contact. In the present embodiment, as preferably illustrated, there is provided a radially outwardly-facing sealing contact surface 280 of an oval cylinder shape. The first housing part 20 may include the engagement regions 27, 28. The engagement regions 27, 28 may completely encircle the fluid outlet 25.

Figure 8:
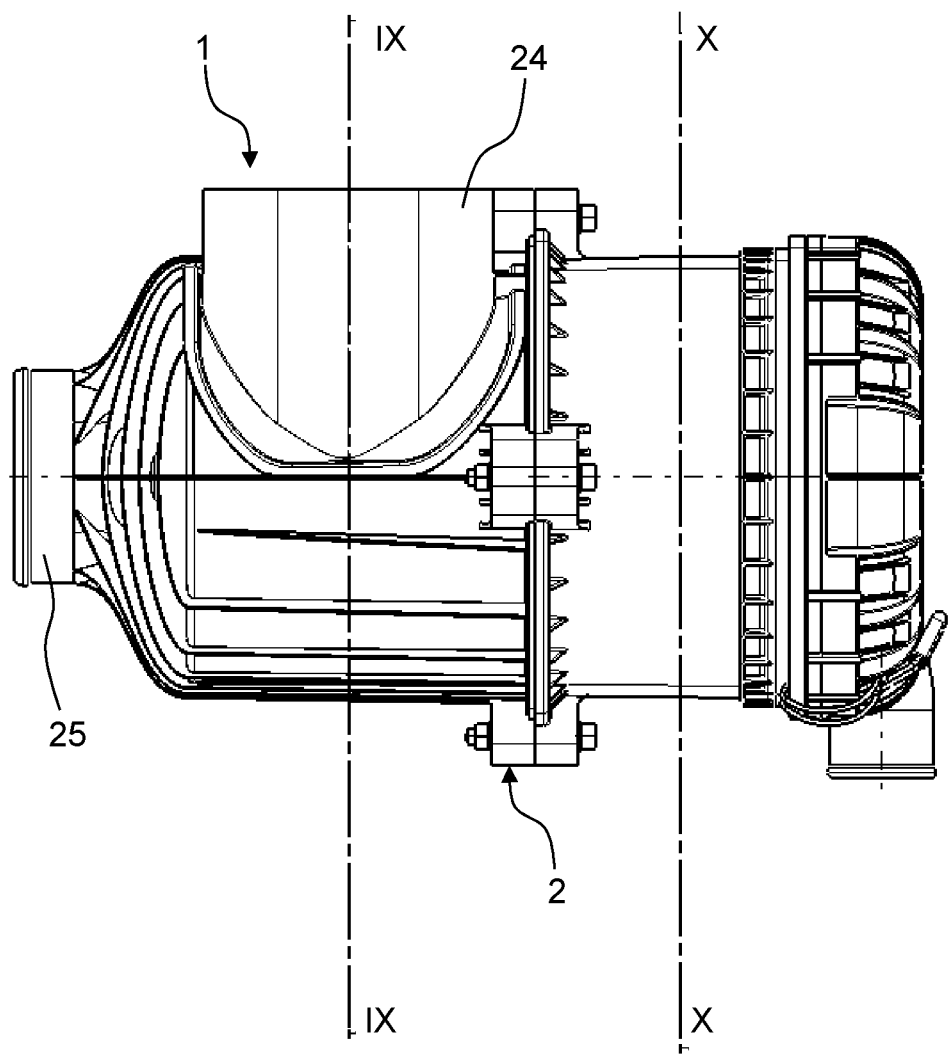
FIG. 8 illustrates a schematic view of the filter arrangement according to FIG. 1.
Figure 9:
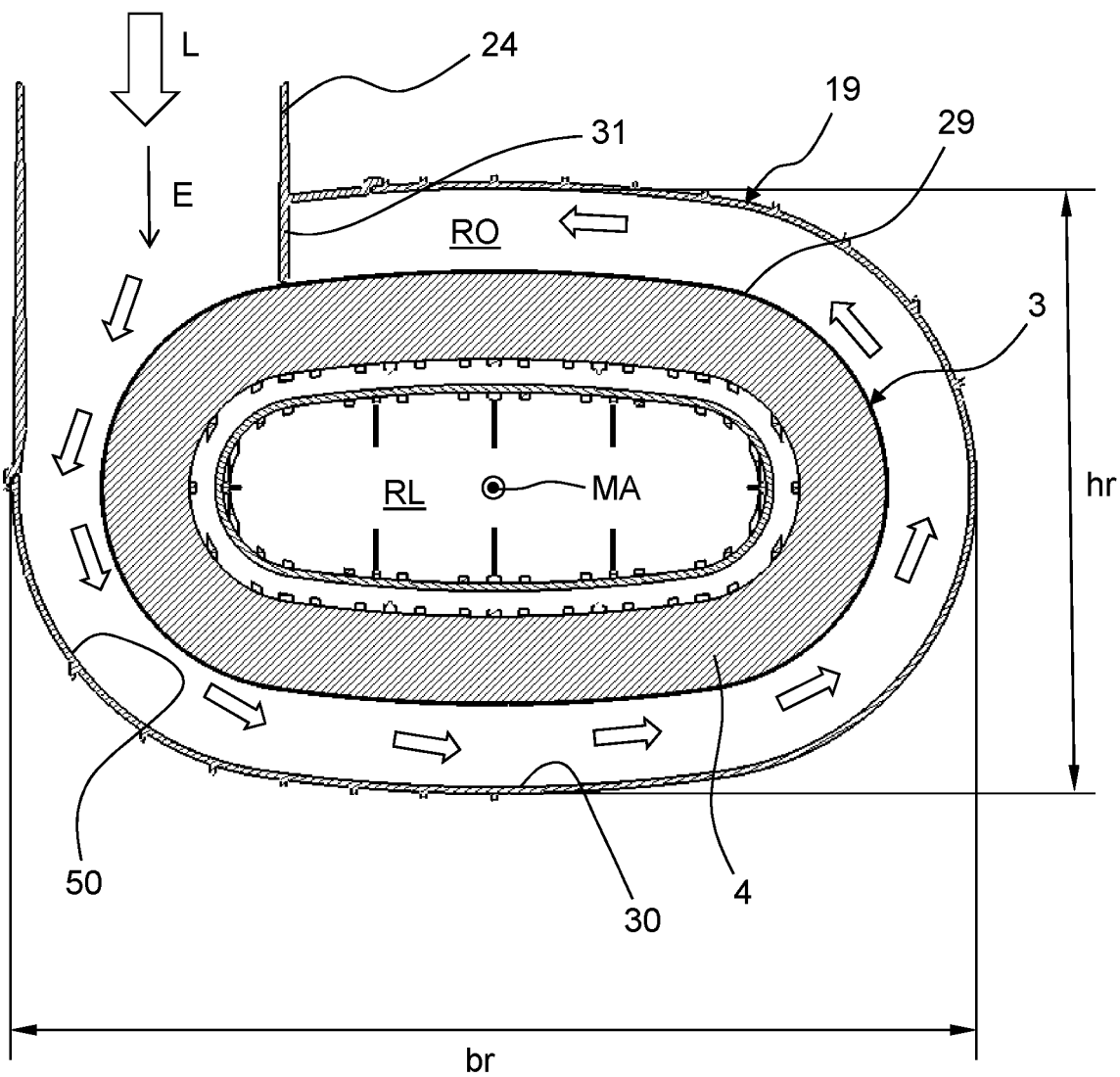
FIG. 9 illustrates a schematic sectional view of the filter arrangement taken along the line IX-IX in FIG. 8.

FIG. 8 illustrates the filter arrangement 1 in a schematic side view. As FIG. 9 illustrates in a schematic sectional view taken along the IX-IX line in FIG. 8, the fluid inlet 24 is arranged such that the inflow direction E of the fluid L is oriented in the direction of an outer surface 29 and perpendicular to the longitudinal direction LR of the filter element 3 arranged in the holding section 19. The outer surface 29 forms an envelope around the filter body 4. A cylindrical—in particular, oval cylindrical—shape of the filter element 3 is formed by the end plates 7, 8 and the outer surface 29. The fluid L to be filtered flows through the filter element 3, which can be held in the holding section 19, in such a manner that particles contained in the fluid L to be filtered are separated out with the aid of centrifugal force at a wall 30 of the filter holder 2 or the holding section 19. The holding section 19 thus acts as a centrifugal separator. In particular, the inflow direction E is oriented such that the fluid L to be filtered flows to the filter element 3 substantially tangentially. The holding section 19, in cross-section, preferably has a width direction br and a height direction hr. The width-to-height ratio br/hr is preferably at least 4:3, more preferably at least 3:2, in particular at least 2:1, and/or at most 6:1, preferably at most 4:1, particularly preferably at most 3:1 or 2:1. Ratios lower than 3:1 and preferably less than 2:1 or even 1.5:1 are advantageous for the purpose of an optimized pre-separation. Preferably, the fluid inlet 24 is arranged such that the inflow direction E is oriented perpendicular to the width direction br, i.e., preferably perpendicular to the direction of the wider expansion.

Orienting the fluid inlet 24 such that the in-flowing fluid L strikes against a relatively more curved curvature 50 of the wall 30 of the holding section 19 greatly accelerates the fluid L to be filtered, and causes the fluid to then flow tangentially, in particular, helically through the filter element 3. This achieves favorable separation of particles from the fluid L. The fluid inlet 24 may be shielded from the fluid L flowing through the filter element 3 with the aid of a wall 31, which supports the construction of a helical flow. The separated particles are removed from the holding section 19 with the aid of the particle discharge opening 26. The holding section 19 runs in the longitudinal direction LR of the filter element 3, parallel to the outer surface 29 of the filter element 3, so that—as illustrated in FIG. 10—a constant distance a is provided between the filter element 3 and the wall 30, perpendicularly to the longitudinal direction LR and circumferentially about the filter element 3.

Figure 11:
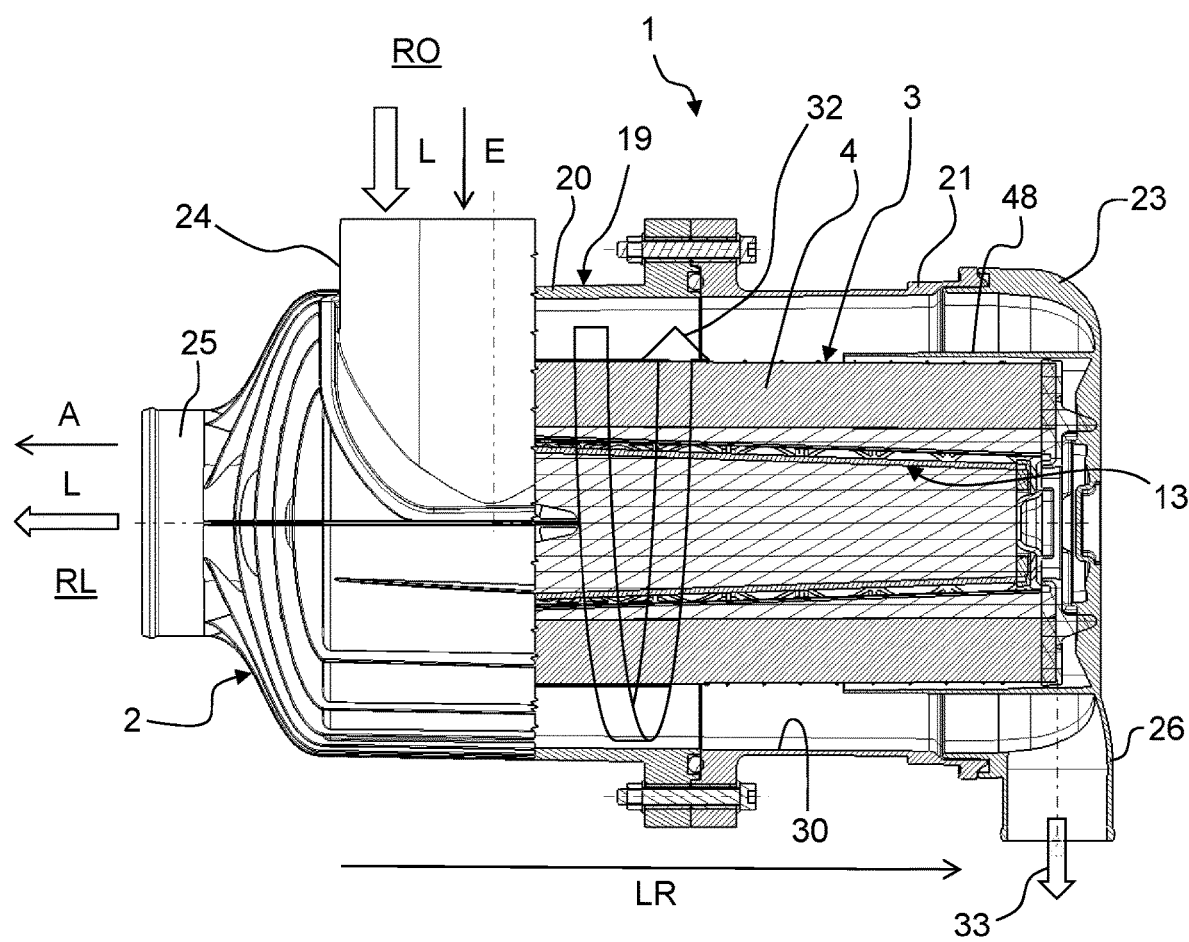
FIG. 11 illustrates a schematic partial sectional view of the filter arrangement according to FIG. 1.

FIG. 11 illustrates a partial sectional view of the filter arrangement 1. The fluid L to be filtered flows through the fluid inlet 24 into the holding section 19. Orienting the inflow direction E of the fluid L to be filtered in the direction of the outer surface 29 of the filter element 3 and, in particular, also perpendicular to the longitudinal direction LR causes the fluid L to be filtered to flow—as illustrated in FIG. 11 with the aid of an arrow 32—helically through the filter element 3 and through the filter body 4 of the filter element 3, in order to continue flowing out of the fluid outlet 25 of the filter holder 2 in the outflow direction A, as the filtered fluid L. When flowing through the filter element 3, particles 33 are separated out from the fluid L to be filtered at the wall 30 of the holding section 19 with the aid of centrifugal force; the particles can then be removed from the holding section 19 via the particle discharge opening 26. The particles 33 can, for example, fall out from the particle discharge opening 26, or be suctioned out therefrom. The oval cross-sectional shape of the holding section 19 results in a favorable particle removal alongside suitability of the system for spaces with a non-circular or rectangular cross-section, in comparison to a circular cross-section.

As further illustrated in FIG. 11, the maintenance cover 23 has a tubular, and in particular oval tubular inflow protector 48 in which the filter element 3 is at least partially held, preferably such that a flow gap of several millimeters is formed between the filter element and the inflow protector. The inflow protector 48 may be materially integral with the maintenance cover 23, and, in particular, prevents particles that have been pre-separated out by the rotating flow from, for example, still striking against the filter body 4 due to the effects of gravity.

Figure 12:
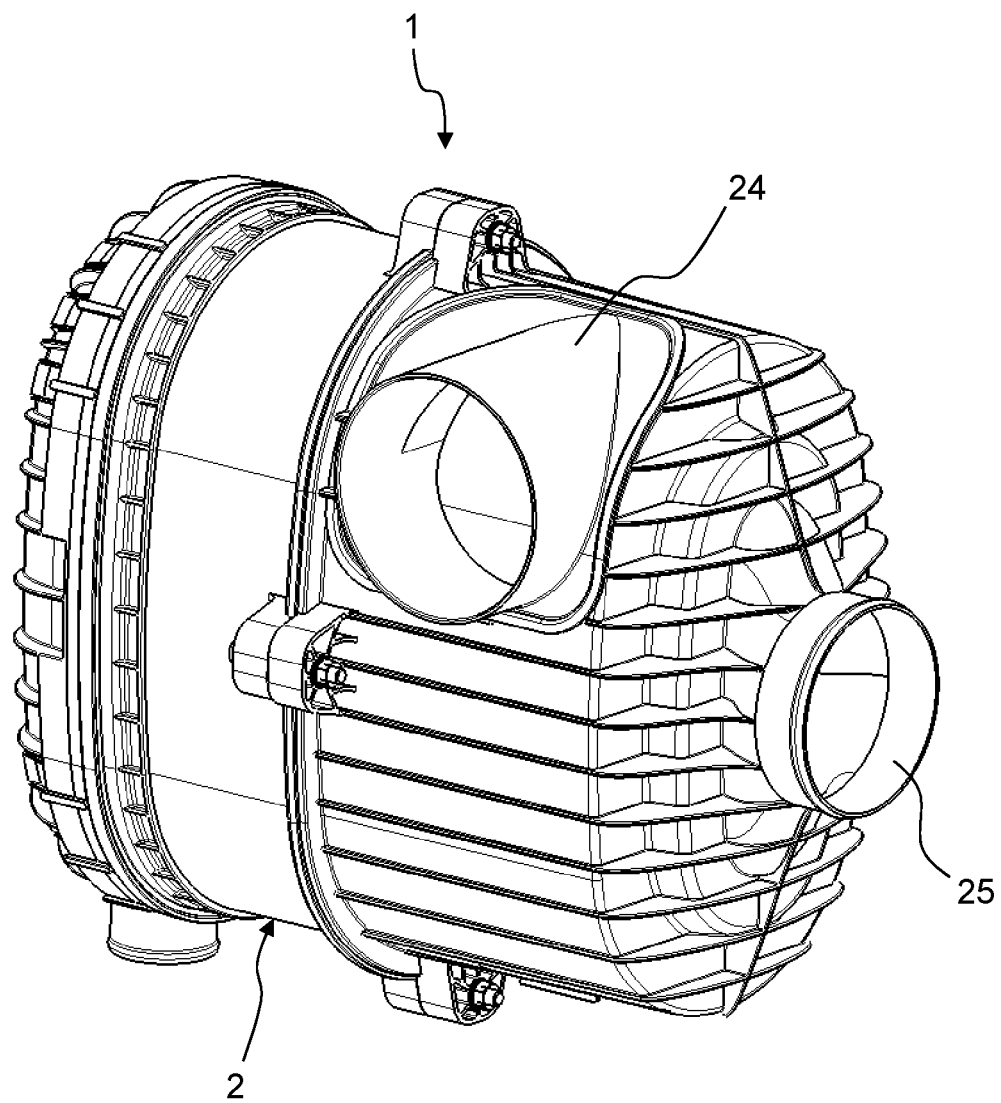
FIG. 12 illustrates a schematic perspective view of another embodiment of a filter arrangement.

FIG. 12 illustrates a schematic perspective view of another embodiment of a filter arrangement 1. The embodiment of the filter arrangement 1 according to FIG. 12 differs from the embodiment of the filter arrangement according to FIG. 1 only in that the fluid inlet 24 does not have an oval cross-section, but rather a circular cross-section.

Figure 13:
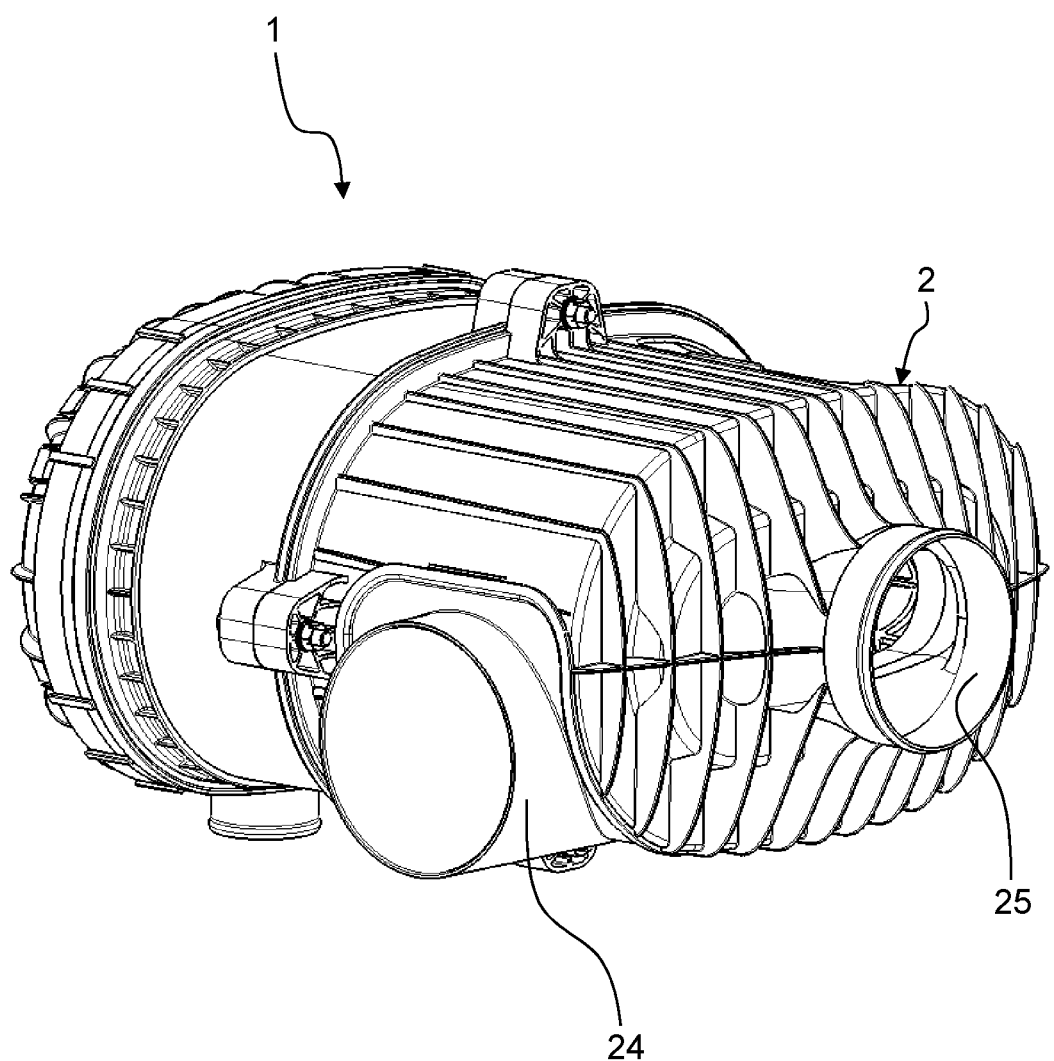
FIG. 13 illustrates a schematic perspective view of another embodiment of a filter arrangement.

FIG. 13 illustrates a schematic perspective view of another embodiment of a filter arrangement 1. The embodiment of the filter arrangement 1 according to FIG. 13 differs from the embodiment of the filter arrangement 1 according to FIG. 12 in that the fluid inlet 24 is positioned such that the inflow direction E of the fluid L to be filtered is arranged perpendicular to the height direction hr of the holding section 19, i.e., perpendicular to the direction of the narrower expansion, and not perpendicular to the width direction br thereof.

Figure 14:
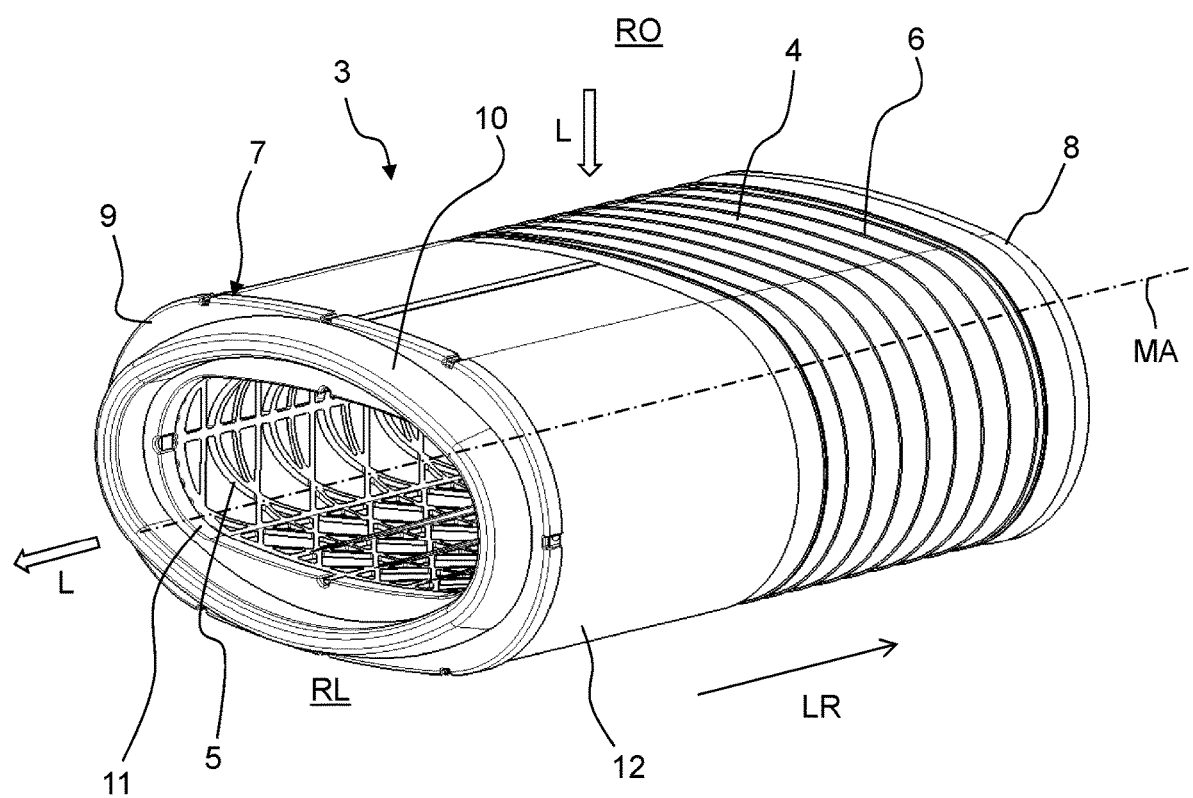
FIG. 14 illustrates a schematic perspective view of another embodiment of a filter element.
Figure 15:
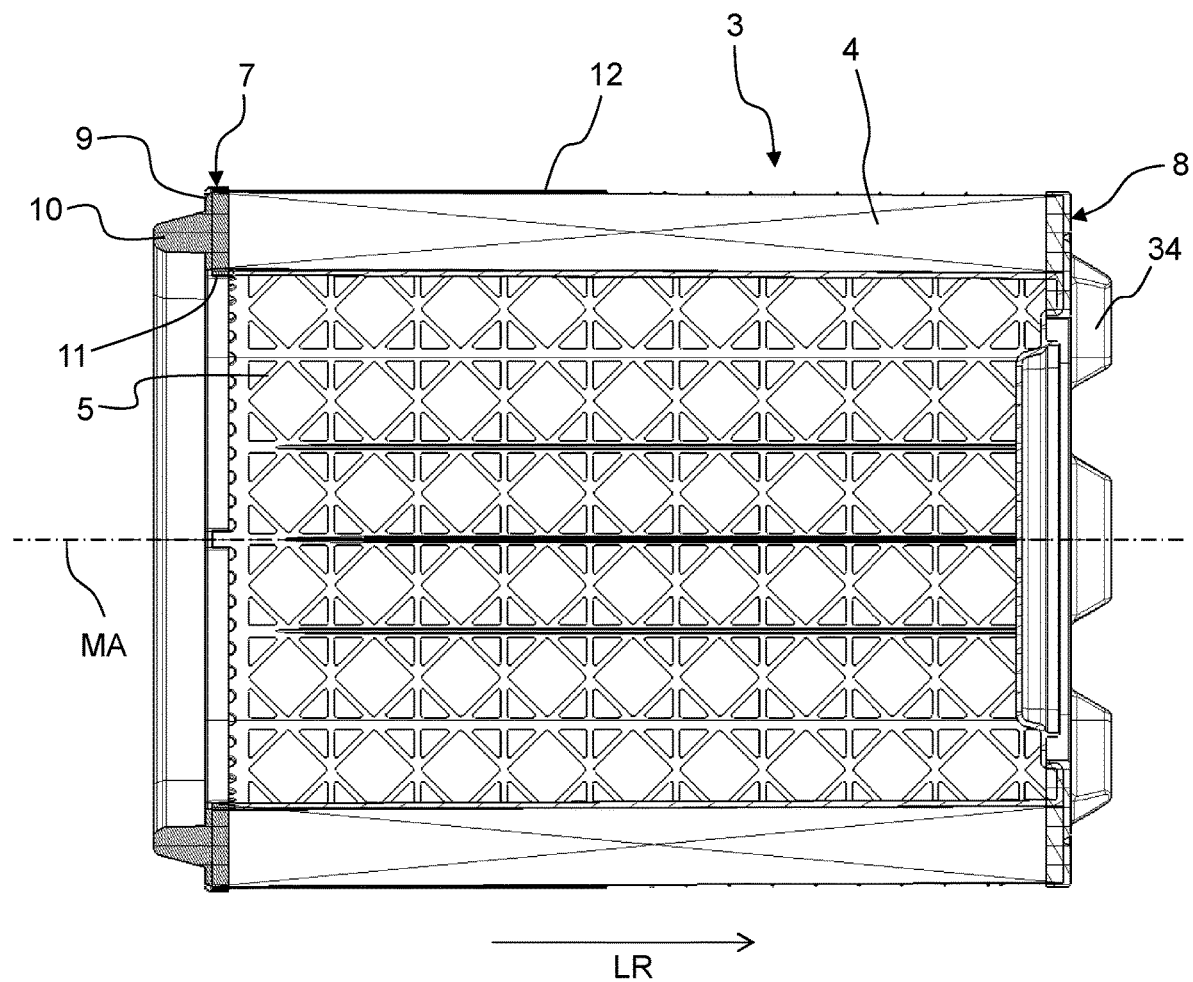
FIG. 15 illustrates a schematic sectional view of the filter element according to FIG. 14.
Figure 16:
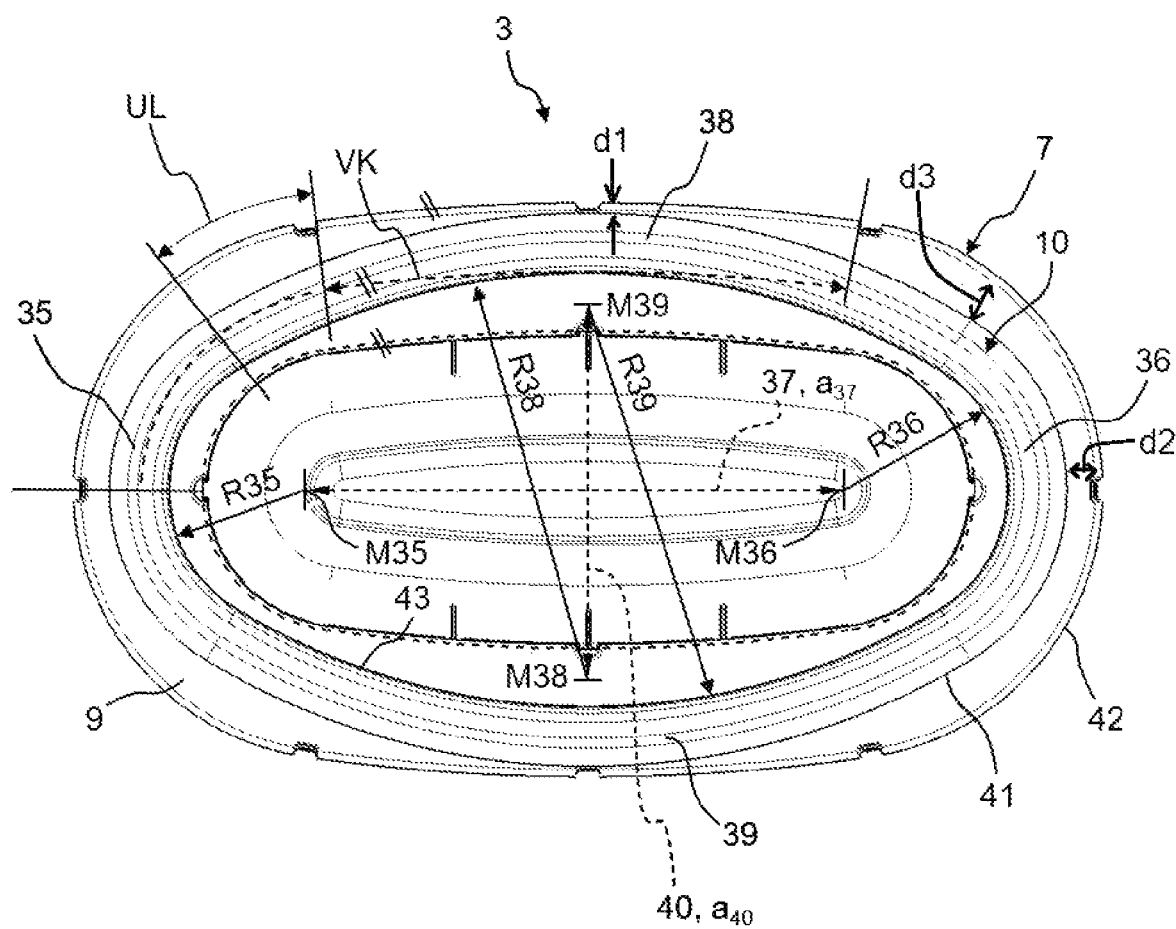
FIG. 16 illustrates a schematic view of the filter element according to FIG. 14.

FIG. 14 illustrates a schematic perspective view of another embodiment of a filter element 3. FIG. 15 illustrates a sectional view of the filter element 3, and FIG. 16 illustrates a front view of the filter element 3. Reference is made hereinbelow to FIGS. 14 to 16 at the same time.

The structure of the filter element 3 according to FIGS. 14 to 16 essentially corresponds to the structure of the filter element 3 according to FIG. 6. The filter element 3 has a first end plate 7 and a second end plate 8. A folded filter body 4 is positioned between the end plates 7, 8. The end plates 7, 8 are preferably produced from a molded polyurethane material, especially a foamed one, which encloses the filter body in a sealed and positively-locked manner at the axial ends thereof. The end plates 7, 8 may also, however, be formed from different materials, such as injection-molded thermoplastic polymer, and may be, for example, fused, welded, or adhered to the filter body 4. The filter body 4 surrounds a grid-shaped central tube 5 or winding core. For filtration of the fluid L to be purified, the fluid flows from a pre-filtration side RO of the filter element 3, through the filter medium of the filter body 4, to a post-filtration side RL of the filter element 3. The first end plate 7 includes a receiving opening 11 for receiving a secondary element 13, through which opening the purified fluid also flows out, according to FIG. 7.

The end plates 7, 8 are preferably oval. The filter body 4 may be partially covered by an inflow protector 12. The inflow protector 12 may be a finely-meshed grid or a foil, which is welded, adhered, or fused to the filter medium. In particular, the inflow protector 12 borders on the first end plate 7. The inflow protector 12 prevents particles 33 contained in the fluid L to be filtered—which is entering through the fluid inlet 24—from striking directly against the filter medium.

The second end plate 8 is preferably fluid-tight, so that no fluid L is able to reach therethrough from the pre-filtration side RO to the post-filtration side RL of the filter element 3. The second end plate 8 may include, for example, bracing elements 34, only one of which is provided with a reference sign in FIG. 15. The bracing elements may be configured as elastically deformable continuations 8 in the longitudinal direction LR from the end plate 8, the continuations being supportable on the maintenance cover 23 when the maintenance cover is being mounted, and elastically braced by the mounting of the maintenance cover 23. There may be any number of bracing elements 34. The elastically deformable bracing elements 34 make it possible to optimally position the filter element 3 in the holding section 19 of the filter holder 2 with respect to a longitudinal direction LR of the filter element 3. The bracing elements 34 are also used for vibration damping and/or tolerance compensation. The second end plate 8 is preferably materially integral with the bracing elements 34. For example, the second end plate 8 may be formed of a polyurethane foam.

An elastically deformable sealing device 10 for sealing the filter element 3 off from the holding section 19 is provided at the first end plate 7, and, in particular, at a front side 9 of the first end plate 7 that faces away from the filter body 4. The sealing device 10 is resiliently deformable. Preferably, the first end plate 7 and the sealing device 10 are materially integral. For example, the first end plate 7 and the sealing device 10 may be made from a polyurethane foam. The sealing device 10 completely encircles the first end plate 7. The sealing device 10 is completely inside the cross-section of the filter body 4, in particular, as projected in the longitudinal direction LR.

The sealing device 10, as illustrated in FIG. 16, includes two first convex curvature sections 35, 36 arranged so as to face one another. The first curvature sections 35, 36 each have a first radius of curvature R35, R36. The radii of curvature R35 and R36 are preferably equal. The radii of curvature R35, R36 have centers of curvature M35, M36. The centers of curvature M35 and M36 lie on a common straight line 37. The sealing device 10 additionally has two second convex curvature sections 38, 39 arranged so as to face one another. The first curvature sections 35, 36 and the second curvature sections 38, 39 are connected to one another in a materially integral manner. The second curvature sections 38, 39 have second radii of curvature R38, R39. The second radii of curvature R38, R39 are equal. Centers of curvature M38 and M39 of the radii of curvature R38 and R39 lie on a common straight line 40. The straight line 40 is arranged so as to be perpendicular to the straight line 37. The straight line 37 has a length $a_{37}$ and the straight line 40 has a length $a_{40}$. Preferably, the straight line 40 divides the straight line 37 in the center, and vice versa. Preferably, the straight line 40 and the straight line 37 intersect at a center point through which a central axis MA of the filter element 3 runs in the longitudinal direction LR, the central axis preferably overlapping with a central axis of the filter holder 2 when the filter element 3 has been installed incorporated the filter holder 2. The sealing device 10 also has an outer contour 41. The outer contour 41 does not run parallel to an outer contour 42 of the first end plate 7. The second radii of curvature R38, R39 are greater than the first radii of curvature R35, R36. The secondary element 13 may have an identically configured sealing device 18.

In FIG. 16, it is also possible to recognize how the contour of the sealing device 10 runs in comparison to a comparison curve VK. In the concrete illustrated embodiment, as also particularly preferable, the comparison curve VK runs parallel to the outer and/or inner contour of the filter body 4, as well as to the outer and/or inner contour of the open end plate 7, and is further preferably concentric thereto. The comparison curve has, in the center of the second curvature sections 38, 39, the same distance to the outer and inner contour of the filter body 4 and to the outer and inner contour of the open end plate 7 as the inner surface 43. FIG. 16 also shows that the sealing device 10 is more curved in the second curvature section 38 thereof than the comparison curve VK. In other words, in the center thereof, the second curvature section 38 of the sealing device 10 has a smaller (preferably the smallest) distance to the outer contour of the end plate 7 or the filter body 4 than in the region of the transition from the second curvature sections 38, 39 to the first curvature sections 35, 36. As also shown by FIG. 16, a result of the above-described shape is that the second curvature sections 38, 39 of the sealing device 10 protrude in an overlap region into the more-curved curvature sections of the end plate 7 or the filter body 4. In this overlap region UL, the distance of the sealing device 10 or the inner surface 43 from the outer contour of the end plate 7 or the filter body 4 is at a maximum. Thus, the width of the end plate 7 can be used in order to shape the sealing device with the greatest possible curvature, and thus to achieve a favorable sealing effect. As is shown in FIG. 16, two first sealing device curvature sections (35, 36) are arranged one facing the other and have a radius of curvature (R35, R36). Two second sealing device curvature sections (38, 39) are arranged one facing the other and have each have a second radius of curvature (R38, R39). As shown in FIG. 16, the radius of curvature (R38, R39) of the second sealing device curvature sections (35,36) is larger than the radius of curvature (R35, R36) of the first sealing device curvature sections (35, 36). As shown in FIG. 16, the two second sealing device curvature sections (38, 39) are each arranged between and connected at opposing ends directly or indirectly to different adjacent ones of the two first sealing device curvature sections (35, 36). The oval circumferential sealing device 10 is preferably a continuous materially integral oval circumferential sealing device surrounding the radially inner contour of the open end plate 7. As shown in FIG. 16, the first sealing device curvature sections (35, 36) have a smaller radius of curvature (R35, R36) than the radially outer contour of the open end plate 7 and the radially inner contour of the open end plate 7 and the oval filter body 4 in the region of the second sealing device curvature sections (35, 36). As shown on FIG. 16, the second sealing device curvature sections (38,39) at a location midway between the opposing ends of the second sealing device curvature sections (38,39) is positioned at a radial distance dl relative to the outer circumferential contour 29 of the filter body 4 and/or a radially outer contour 42 of the open end plate 7. The oval circumferential sealing device 10 at a position of at least one of the opposing ends of the first sealing device curvature sections (35,36) is positioned at a radial distance d3 relative to the outer circumferential contour 29 of the filter body 4 and/or the radially outer contour 42 of the open end plate 7. As shown in FIG. 16, the first sealing device curvature sections (35,36) at a location midway between the opposing ends of the first sealing device curvature sections (35,36) is positioned at a distance d2 relative to the outer circumferential contour 29 of the filter body 4 and/or the radially outer contour 42 of the open end plate 7. As can be seen in FIG. 16, preferably d3>d2 and d3>d1 such that the sealing device 10 has an outer contour 41 which is not parallel to the radially outer contour 42 of the open end plate 7.

Figure 17:
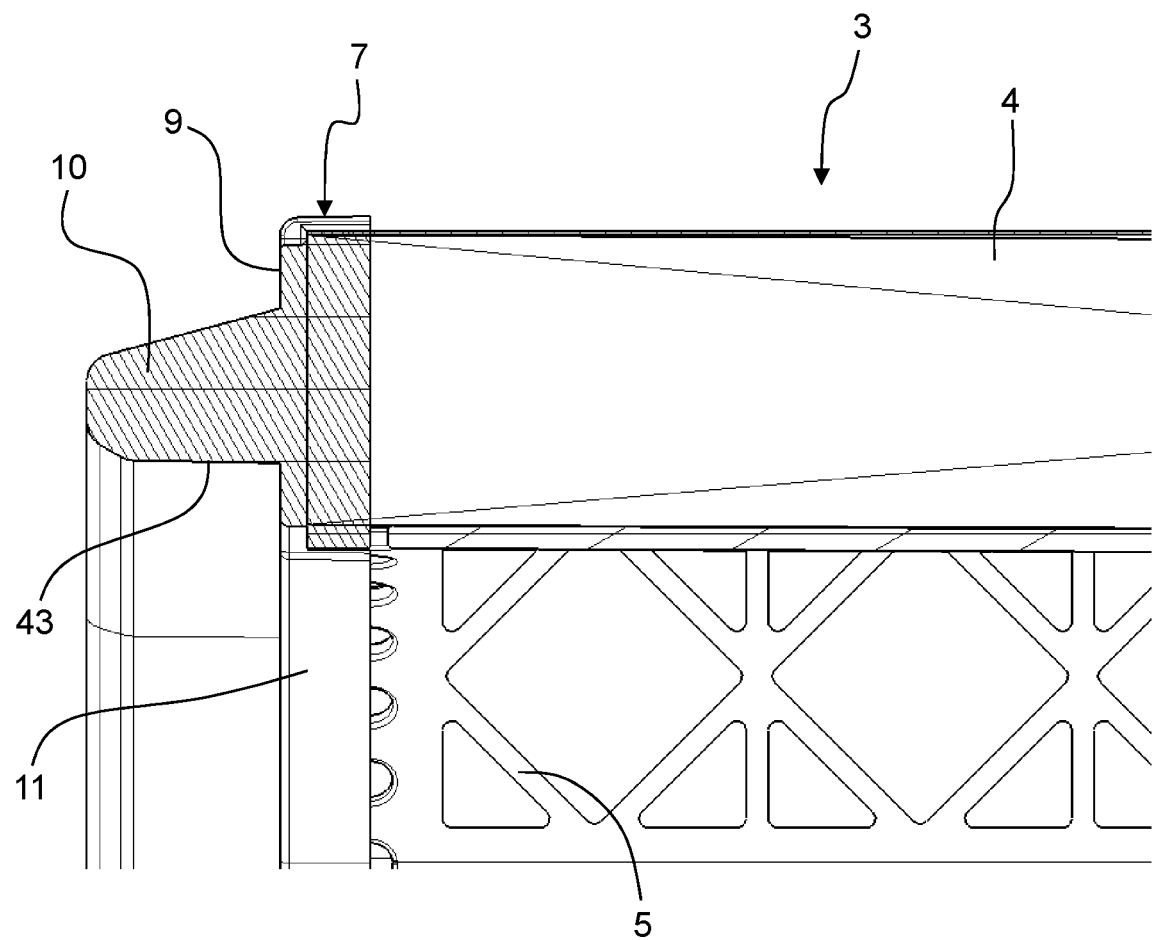
FIG. 17 illustrates a schematic partial sectional view of the filter element according to FIG. 14.
Figure 18:
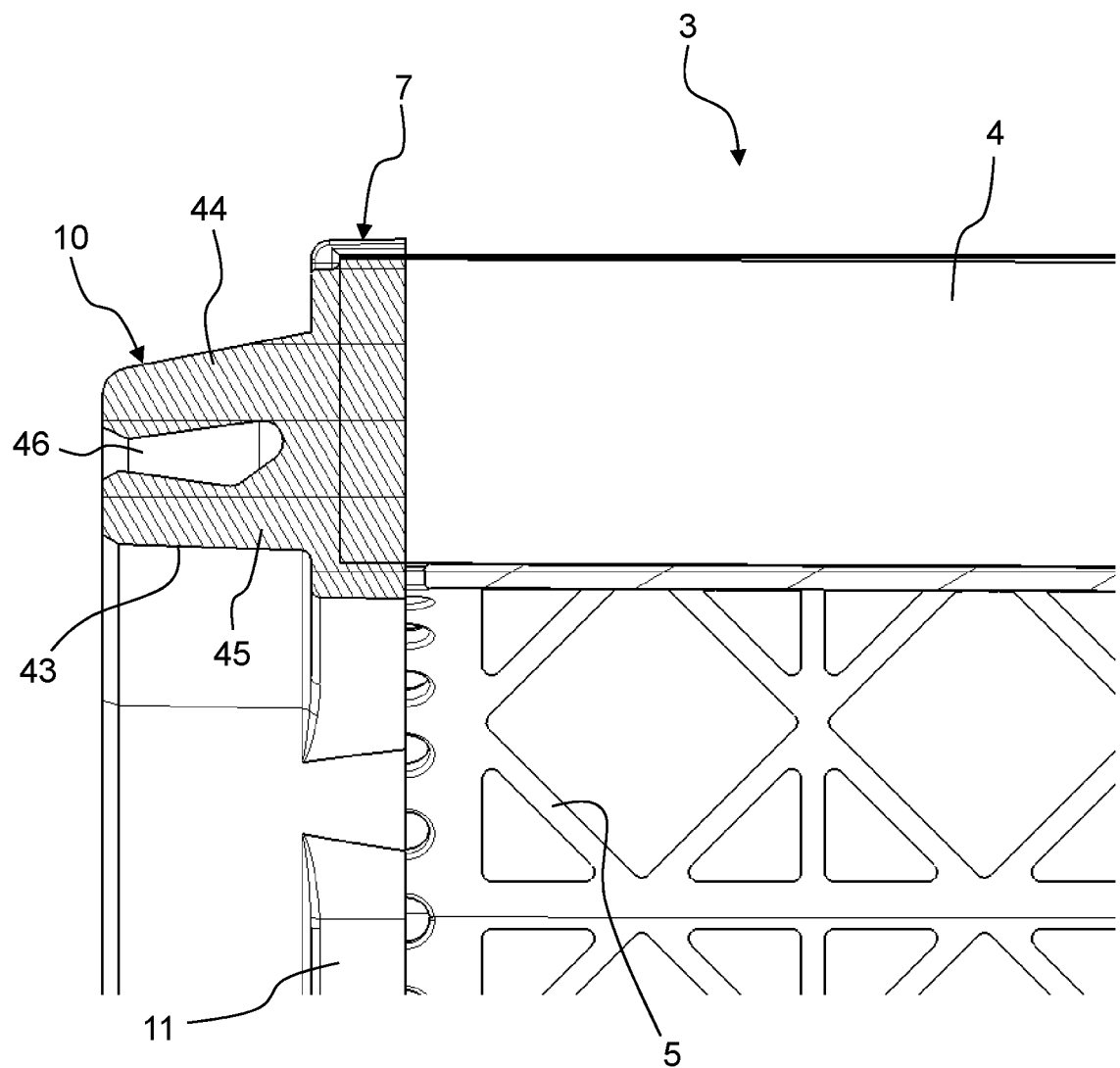
FIG. 18 illustrates a schematic partial sectional view of another embodiment of a filter element.

As illustrated in FIGS. 17 and 18, the sealing device 10 has an oval cylindrical inner surface 43 which forms the sealing surface and rests in a sealed manner against the engagement region 27 of the holding section 19 of the filter holder 2, in particular, against a corresponding sealing contact surface, when the sealing device 10 engages with the engagement region 27. In engagement with the engagement region 27, the sealing device 10 is resiliently deformed, in particular, expanded, in particular, such that the tension of the sealing device 10 against the engagement region 27 is generated exclusively by the resilient deformation. The inner surface 43 then rests in a flat and sealed manner against the engagement region 27. A constant contact pressure of the inner surface 43 against the engagement region 27 is generated around the circumference with the aid of the curvature sections 35, 36, 38, 39. As further illustrated in FIG. 17, the sealing device 10 may have a nearly rectangular shape in cross-section. Furthermore, the sealing device 10 may, as illustrated in FIG. 18, have two sealing lips 44, 45 between which a groove-shaped cavity 46 is arranged. This makes it possible to form a sealing device 10 that is better protected against external influences, due to a filter holder-side tubular web engaging with the groove-shaped cavity such that the inner and/or outer sealing lips can be rested against the tubular web in a sealed manner. The cavity 46 can preferably be axially opened for this purpose.

Figure 19:
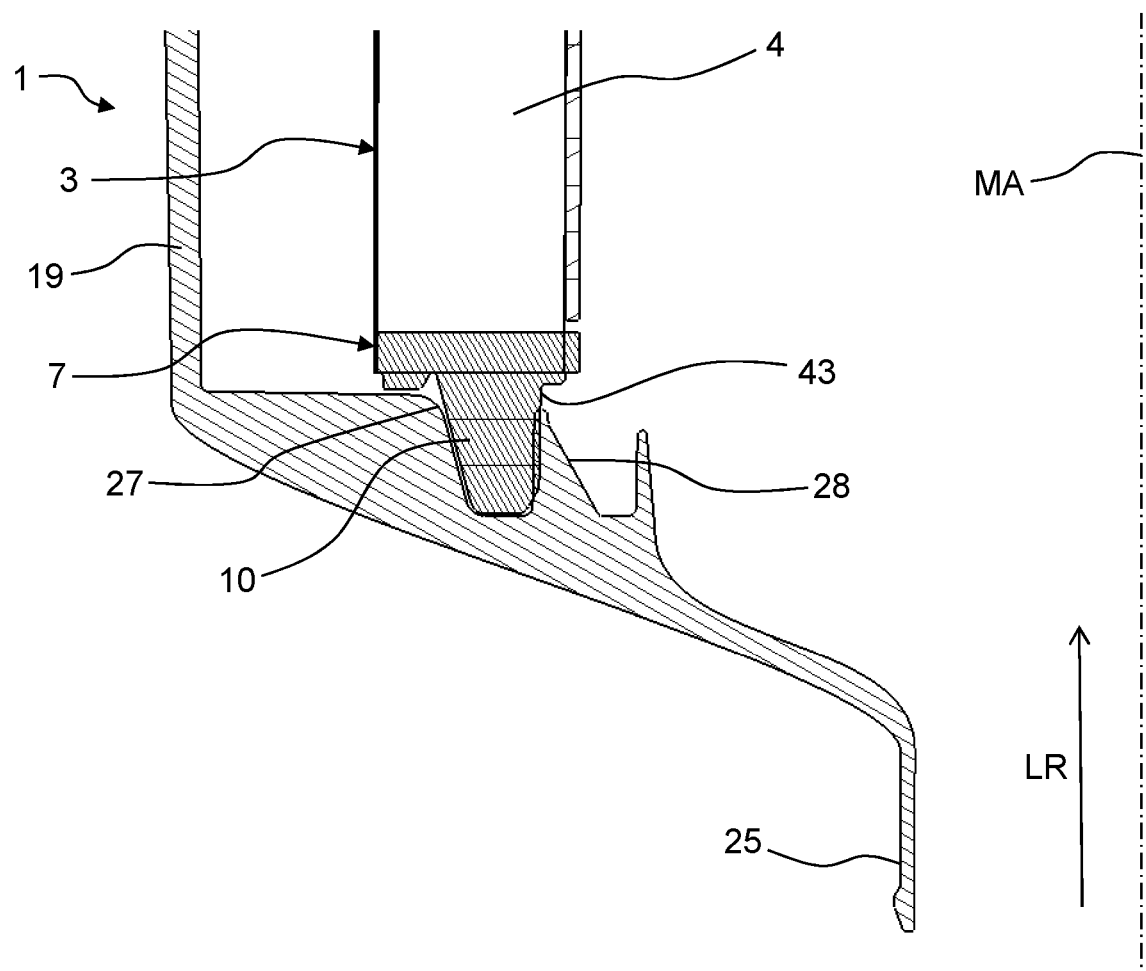
FIG. 19 illustrates a schematic partial sectional view of another embodiment of a filter arrangement.
Figure 32:
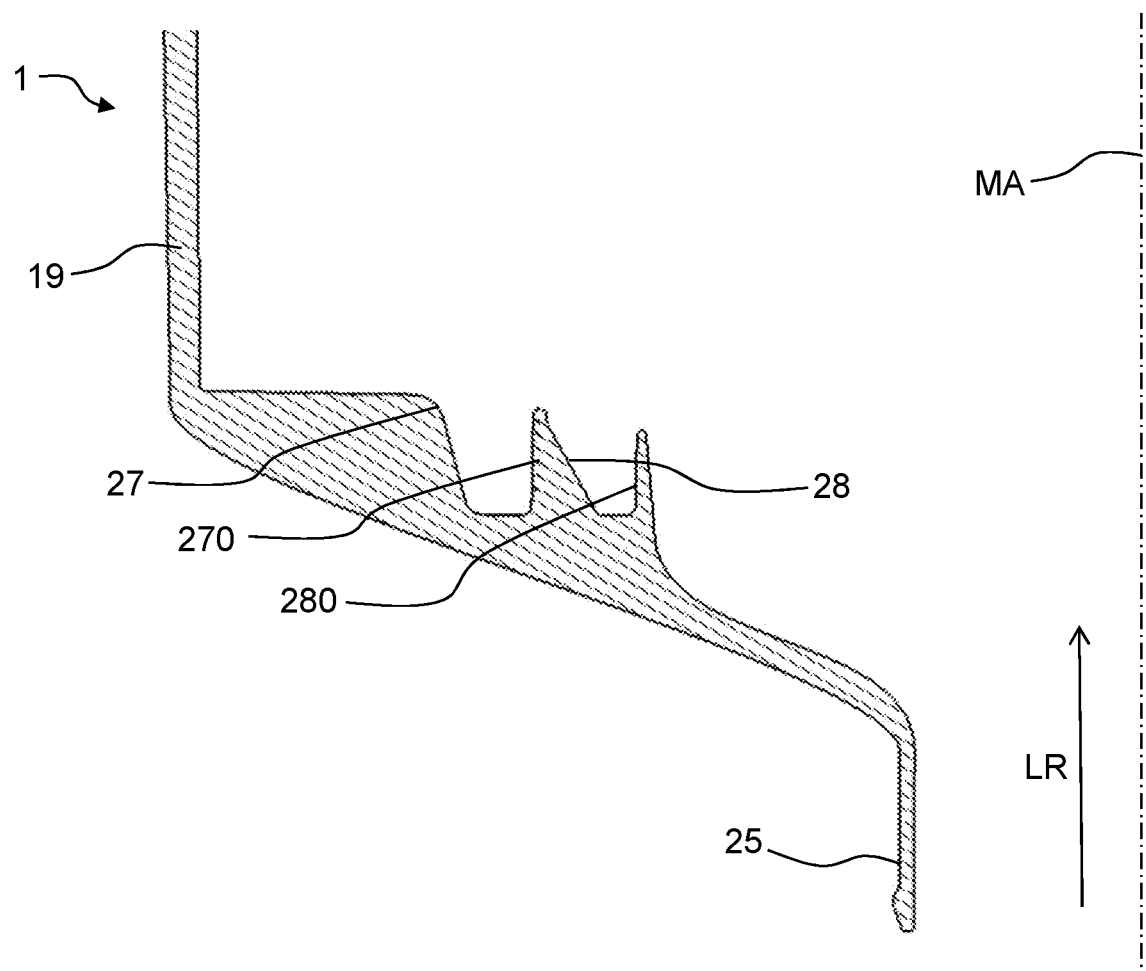
FIG. 32 illustrates a schematic partial sectional view of the embodiment of a filter arrangement according to FIG. 19, without depiction of the filter element.

As illustrated in detail in FIGS. 19 and 32, the sealing device 10 engages with the engagement region 27 of the holding section 19. Here, the inner surface 43 rests in a flat and sealed manner against the engagement region 27, in particular, against a local, radially outward-pointing, oval cylindrical sealing contact surface 270 (see FIG. 32). The sealing device 10 thus radially inwardly seals the filter element 3 off from the holding section 19. "Inwardly" is presently understood to mean a direction directed toward the fluid outlet 25.

Figure 20:
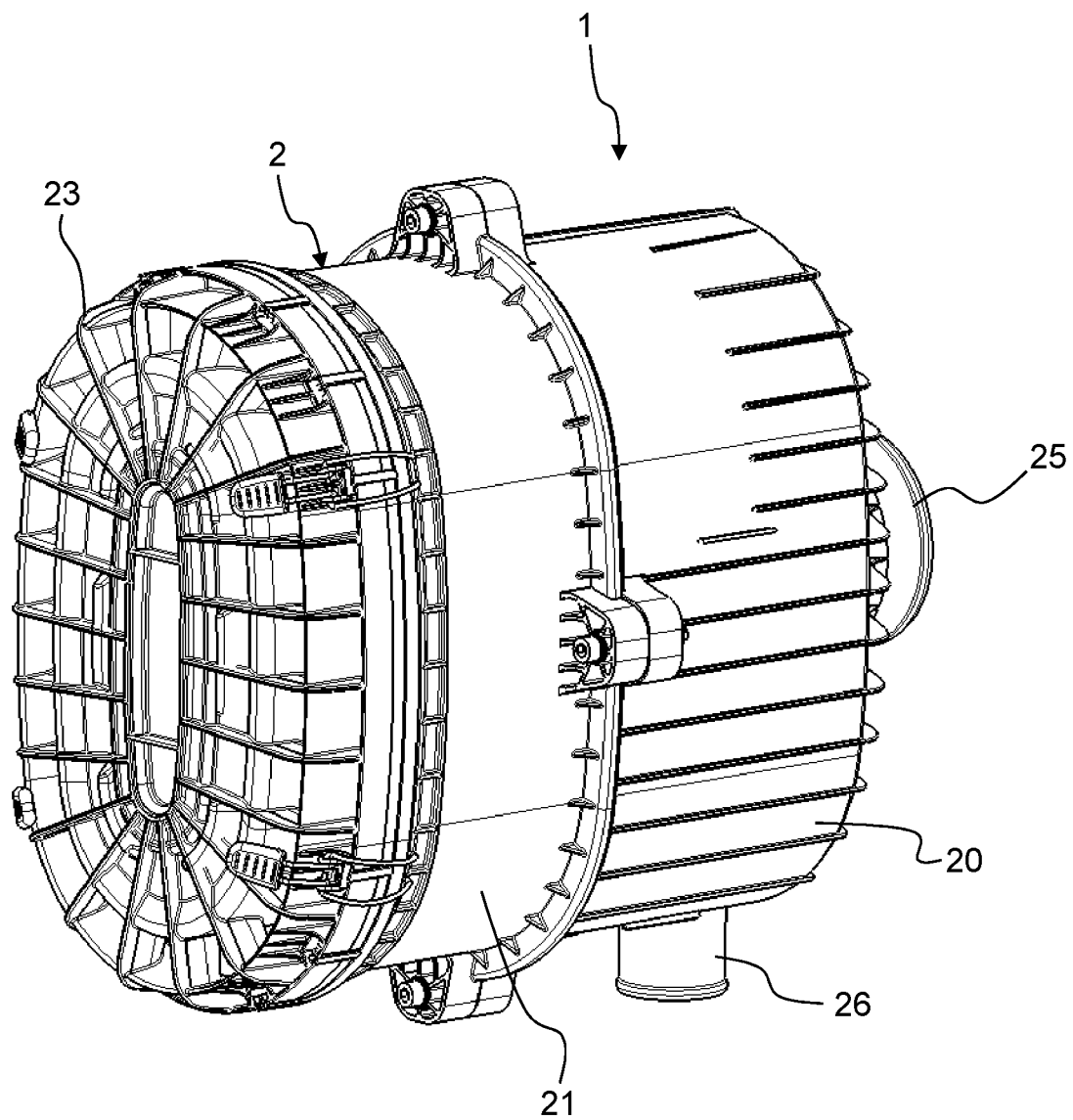
FIG. 20 illustrates a schematic perspective view of another embodiment of a filter arrangement.
Figure 21:
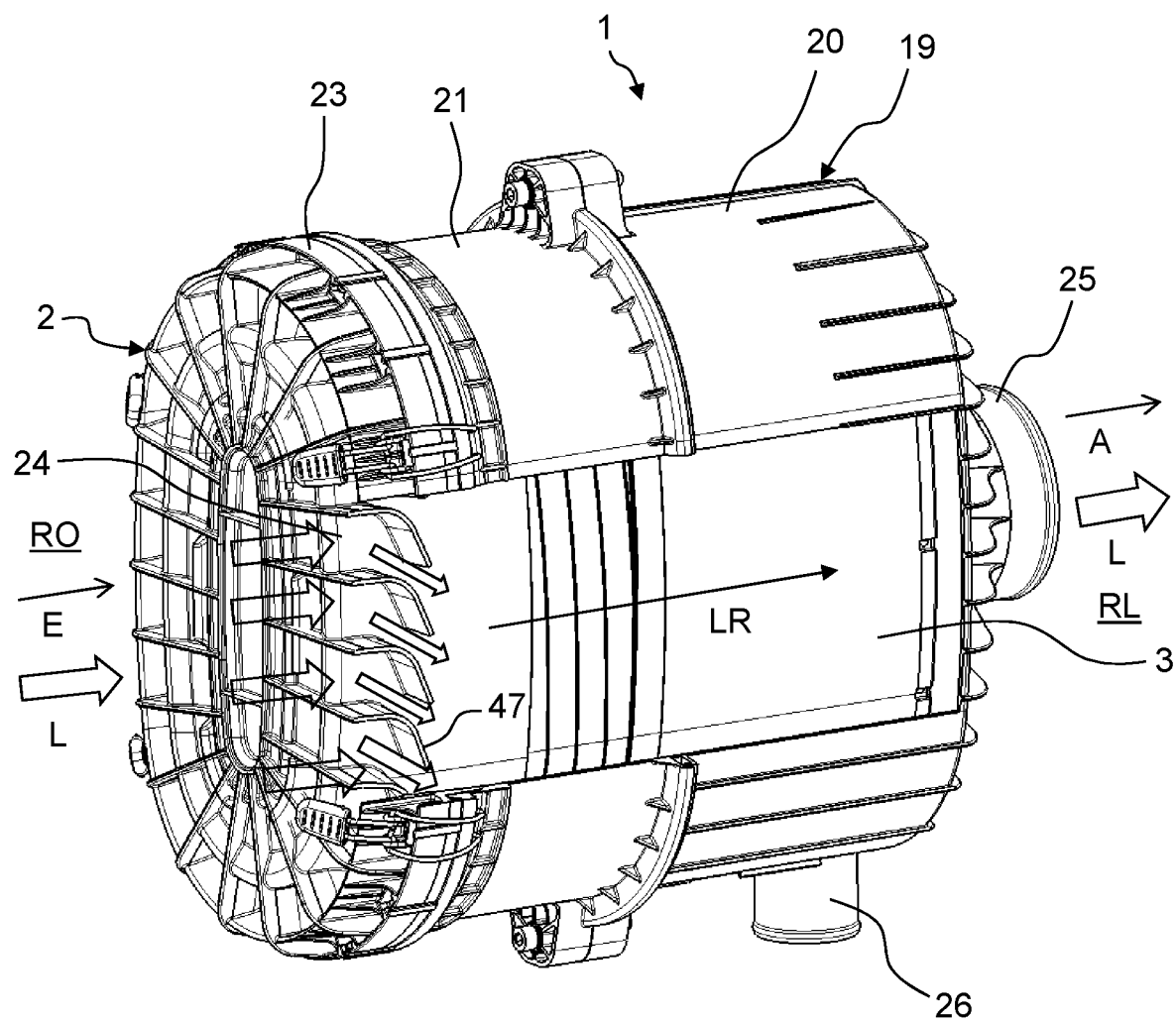
FIG. 21 illustrates a schematic perspective partial sectional view of the filter arrangement according to FIG. 20.
Figure 22:
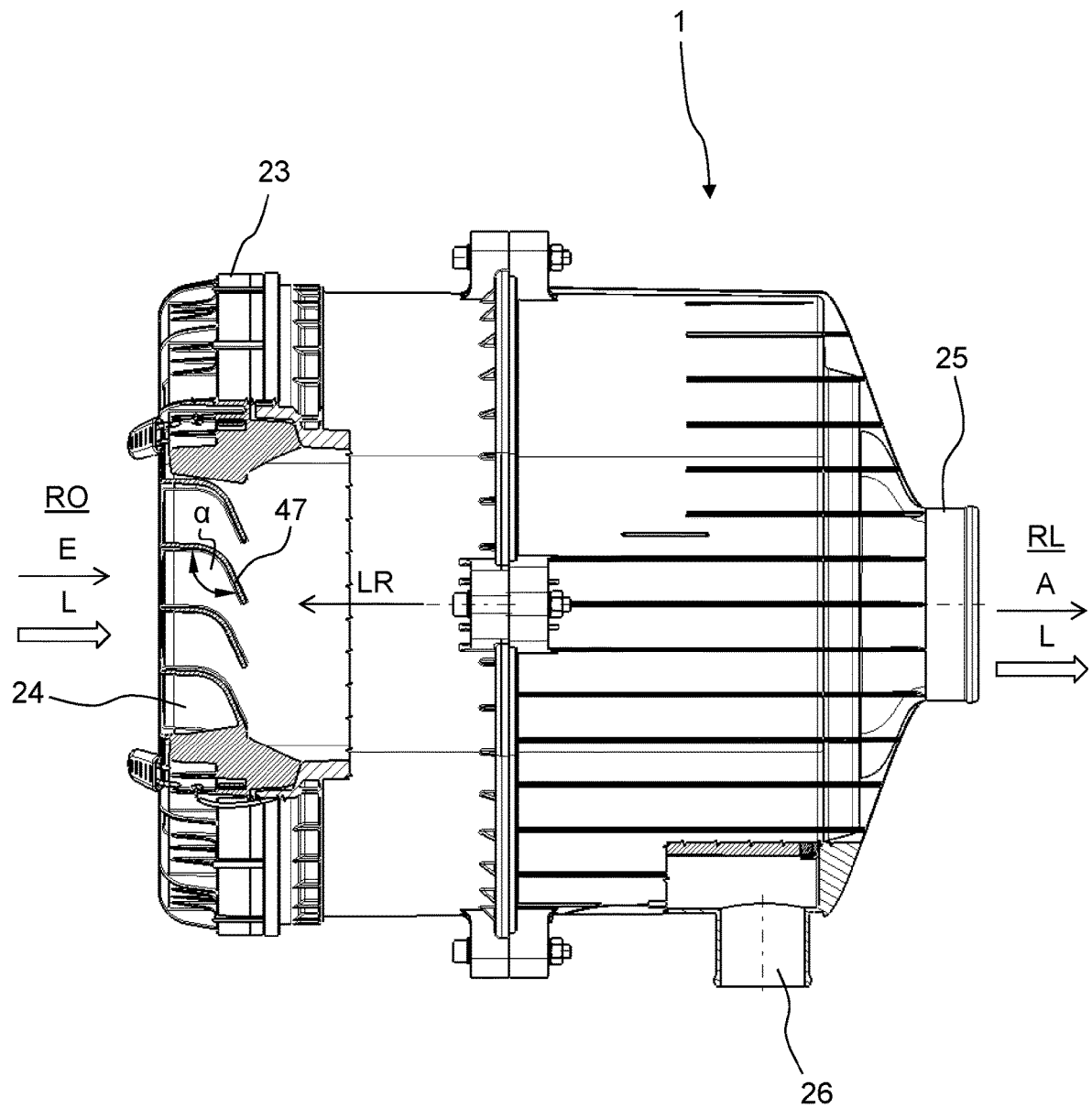
FIG. 22 illustrates a schematic partial sectional view of the filter arrangement according to FIG. 20.

FIG. 20 illustrates a schematic perspective view of another embodiment of a filter arrangement 1. FIG. 21 illustrates a schematic partial sectional view of the filter arrangement 1 according to FIG. 20. The filter arrangement 1 includes a filter holder 2, and a filter element 3 that is arranged in the filter holder 2. A fluid inlet 24 of the filter holder 2 is oriented such that an inflow direction E of the fluid L to be filtered is oriented in the direction of a longitudinal direction LR of the filter element 3. The fluid inlet 24 is preferably arranged on a maintenance cover 23 of the filter holder 2. Any number of fluid inlets 24 can be provided.

Figure 23:
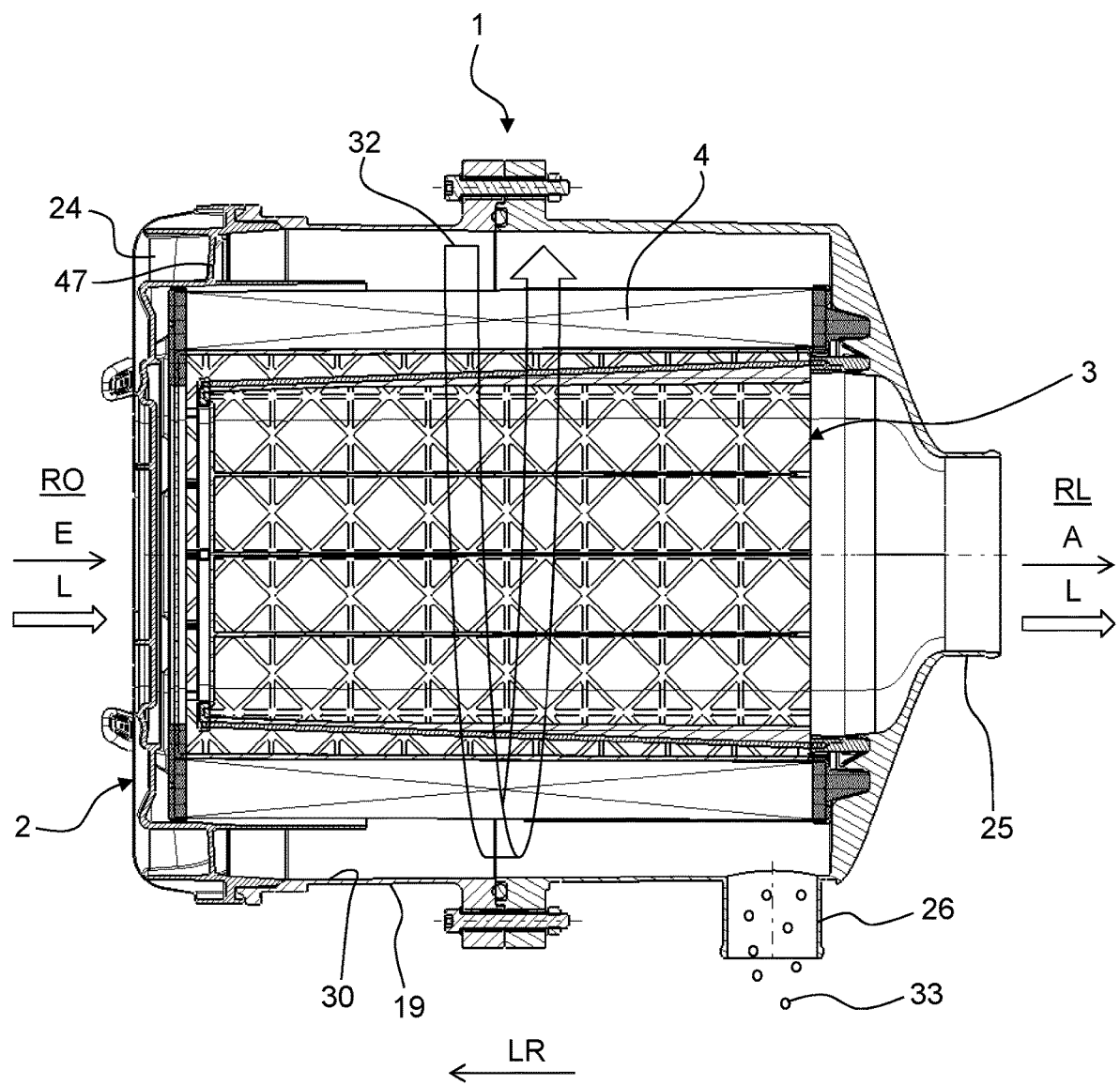
FIG. 23 illustrates a schematic sectional view of the filter arrangement according to FIG. 20.
Figure 24:
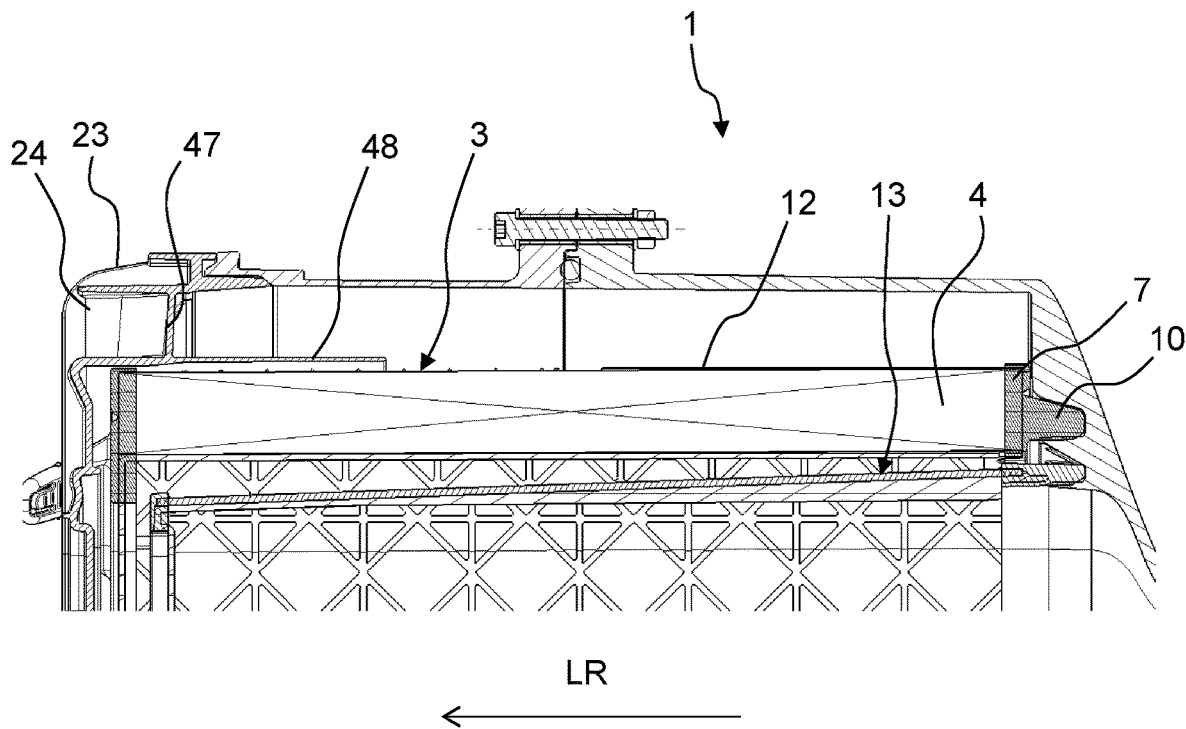
FIG. 24 illustrates a schematic partial sectional view of the filter arrangement according to FIG. 20.

As illustrated in FIGS. 21 to 24, each of the fluid inlets 24 has a guide element 47 for redirecting the fluid L. Each of the guide elements 47 has an angle of curvature a. The guide elements 47 are suitable for redirecting the in-flowing fluid L to be filtered such that the fluid flows helically through the filter element 3, as illustrated in FIG. 23 with the aid of an arrow 32. The flow against the filter element 3 is then tangential. Particles 33 are hereby separated out at a wall 30 of a holding section 19 of the filter holder 2, and can be discharged out from the filter holder 2 via a particle discharge opening 26 of the filter holder 2.

The guide elements 47 may be configured as guide blades. Preferably, any number of fluid inlets 24 are provided so as to be distributed over a circumference u (FIG. 25) of the filter holder 2. The angle of curvature a of the guide elements 47 may be varied about the circumference of the filter element 3, in particular, in order to generate an evenly continuous flow. The maintenance cover 23 may further include a tubular inflow protector 48 illustrated in FIG. 24, which is configured materially integrally with the maintenance cover 23. The inflow protector 48 prevents the fluid L to be filtered from directly flowing to the filter element 3, in particular, by separating the fluid inlets 24 from the filter element 3 so as to prevent the particles 33 from directly striking against the filter medium.

Figure 25:
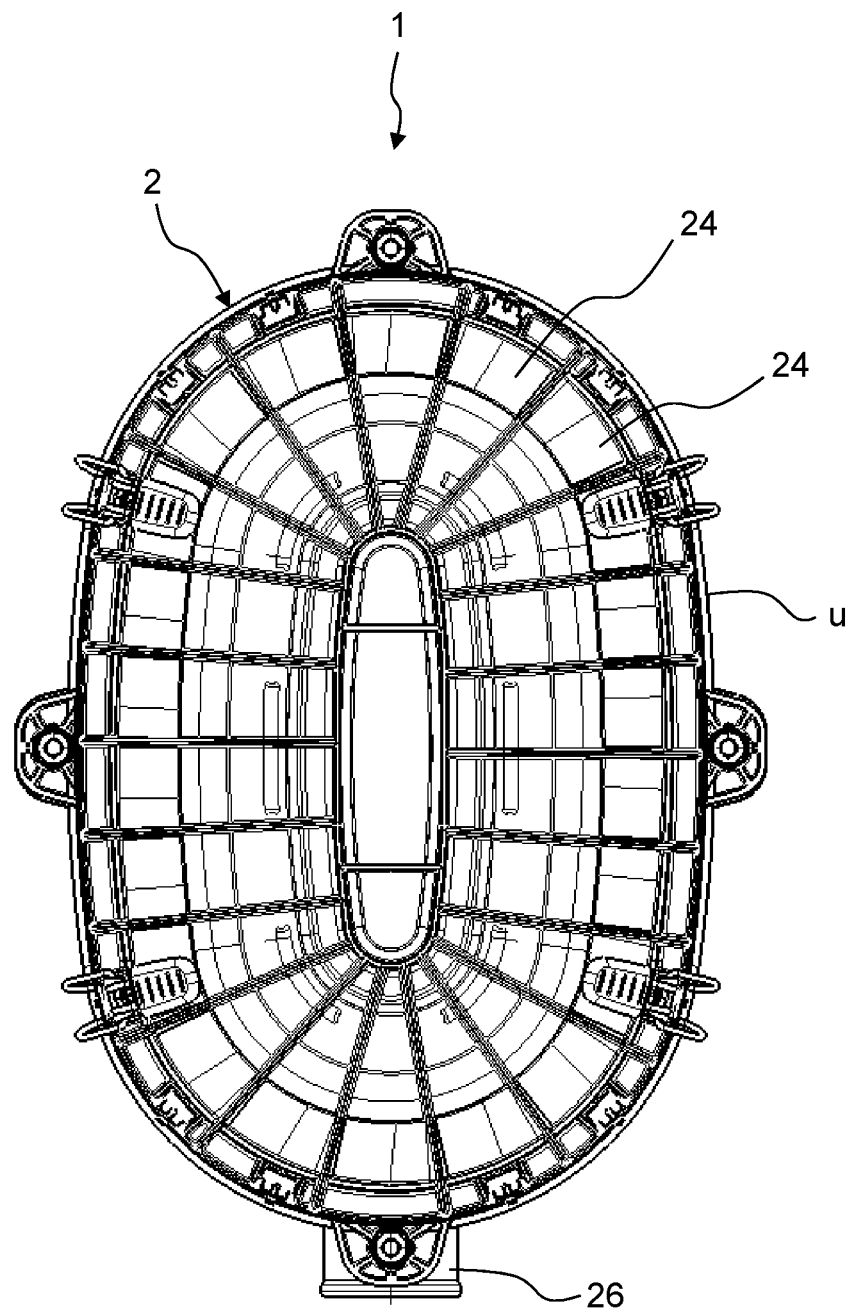
FIG. 25 illustrates a schematic view of the filter arrangement according to FIG. 20.

FIG. 25 illustrates a plan view of the filter arrangement 1. As illustrated in FIG. 25, a plurality of fluid inlets 24 may be provided, only two of which are provided with a reference sign in FIG. 25. An opening cross-section of the fluid inlets 24 may vary over the circumference u of the filter holder 2. For example, opening cross-sections of the fluid inlets 24 in regions of greater curvature in the filter element 3 may be larger or smaller than in regions of the filter element 3 in which the filter element has a low curvature.

Figure 26:
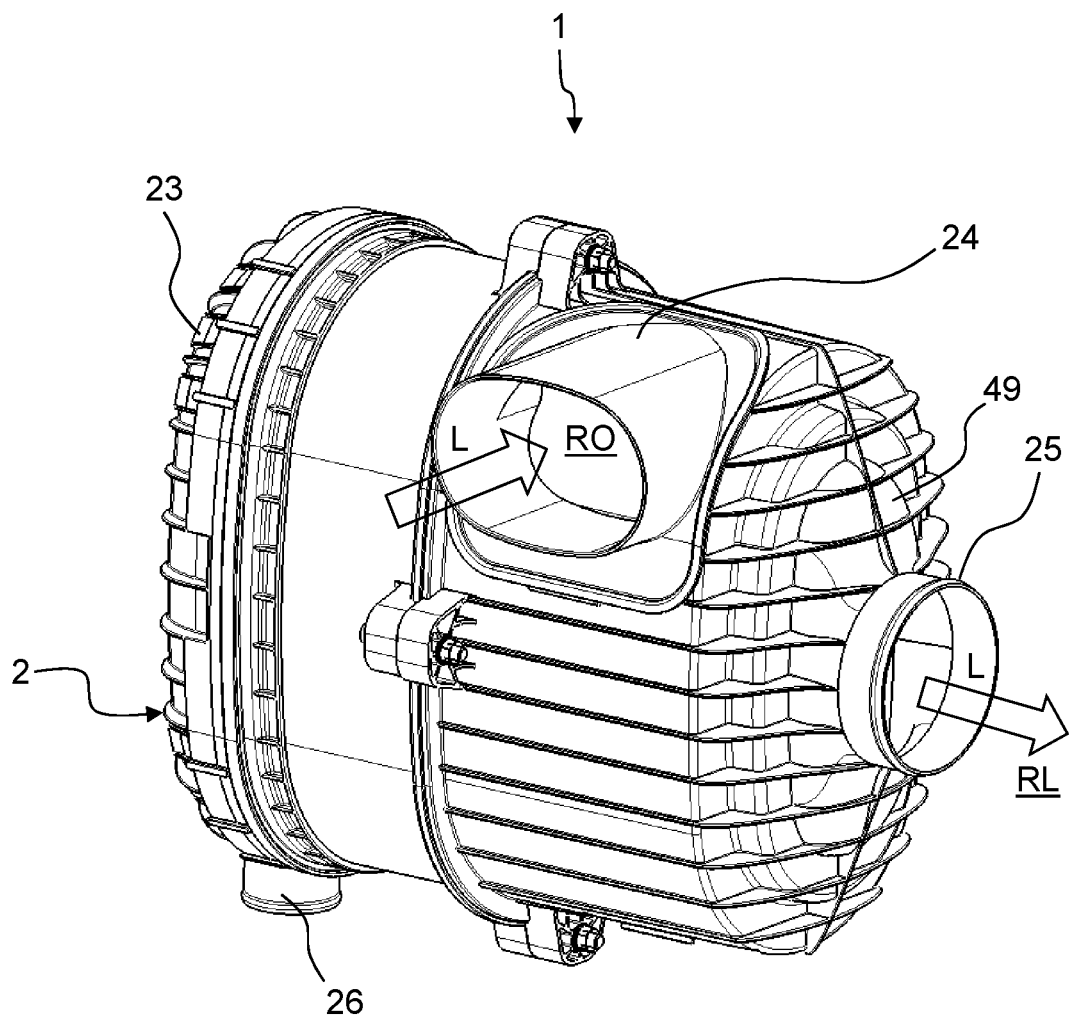
FIG. 26 illustrates a schematic perspective view of another embodiment of a filter arrangement.
Figure 27:
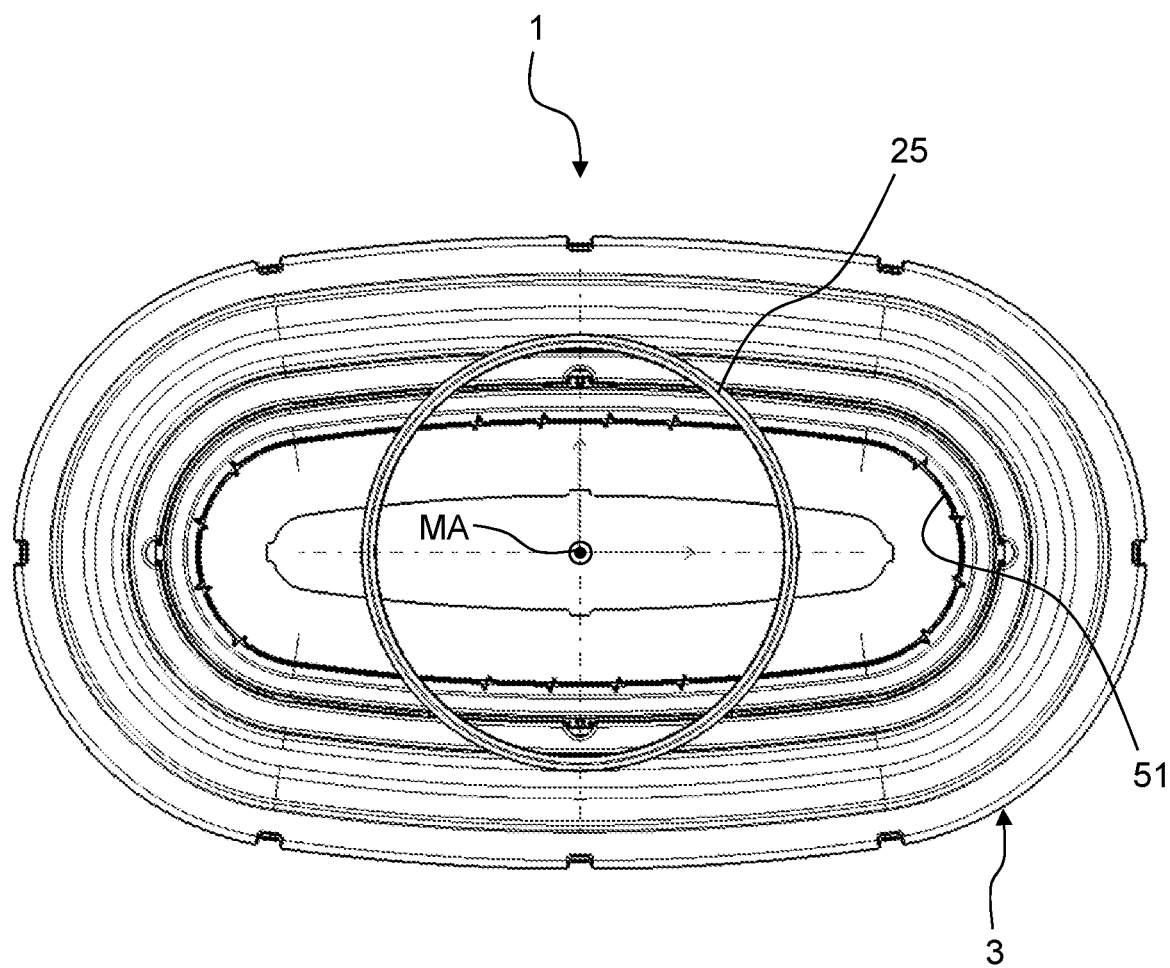
FIG. 27 illustrates a schematic view of the filter arrangement according to FIG. 26.
Figure 28:
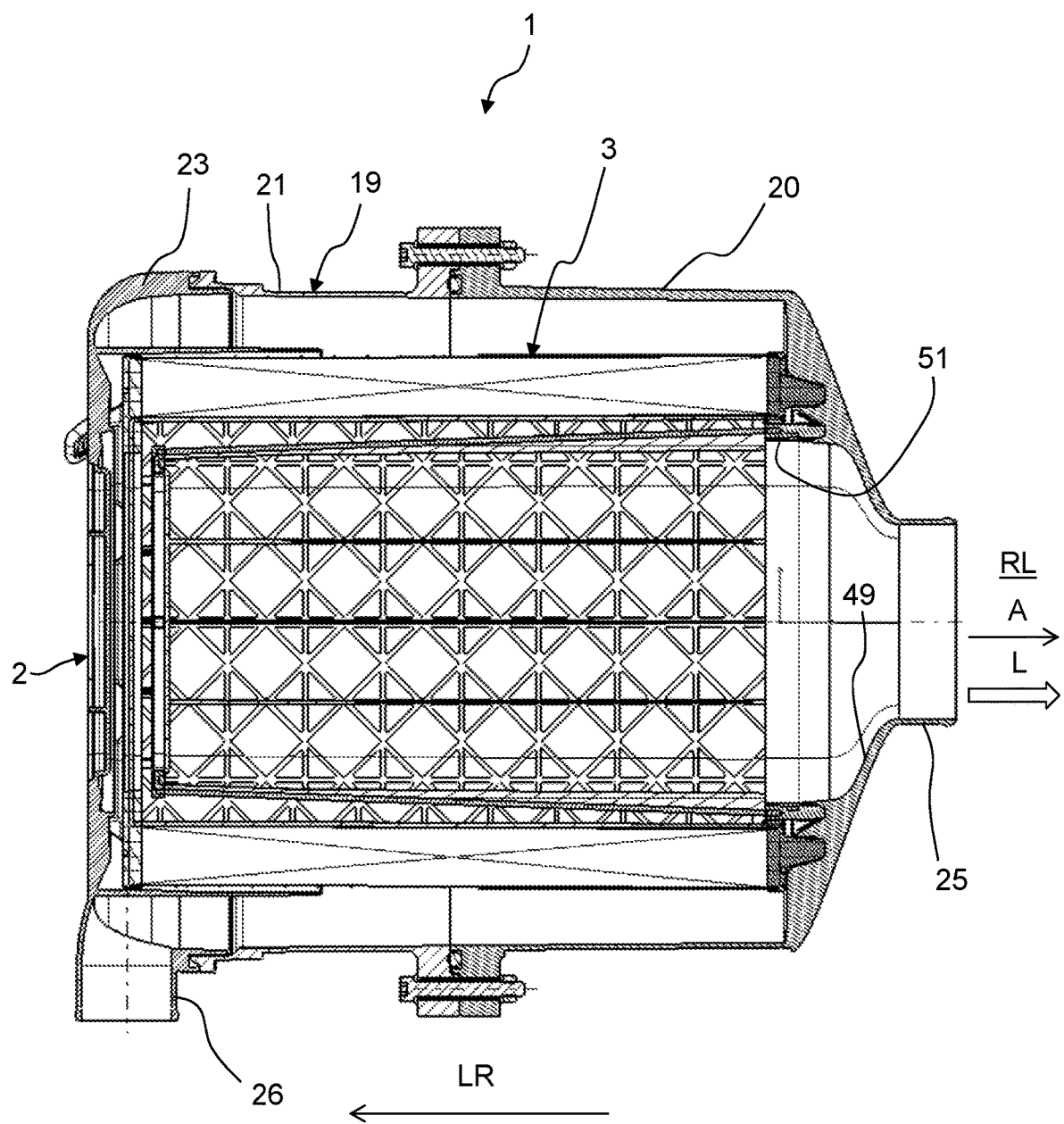
FIG. 28 illustrates a schematic sectional view of the filter arrangement according to FIG. 26.
Figure 29:
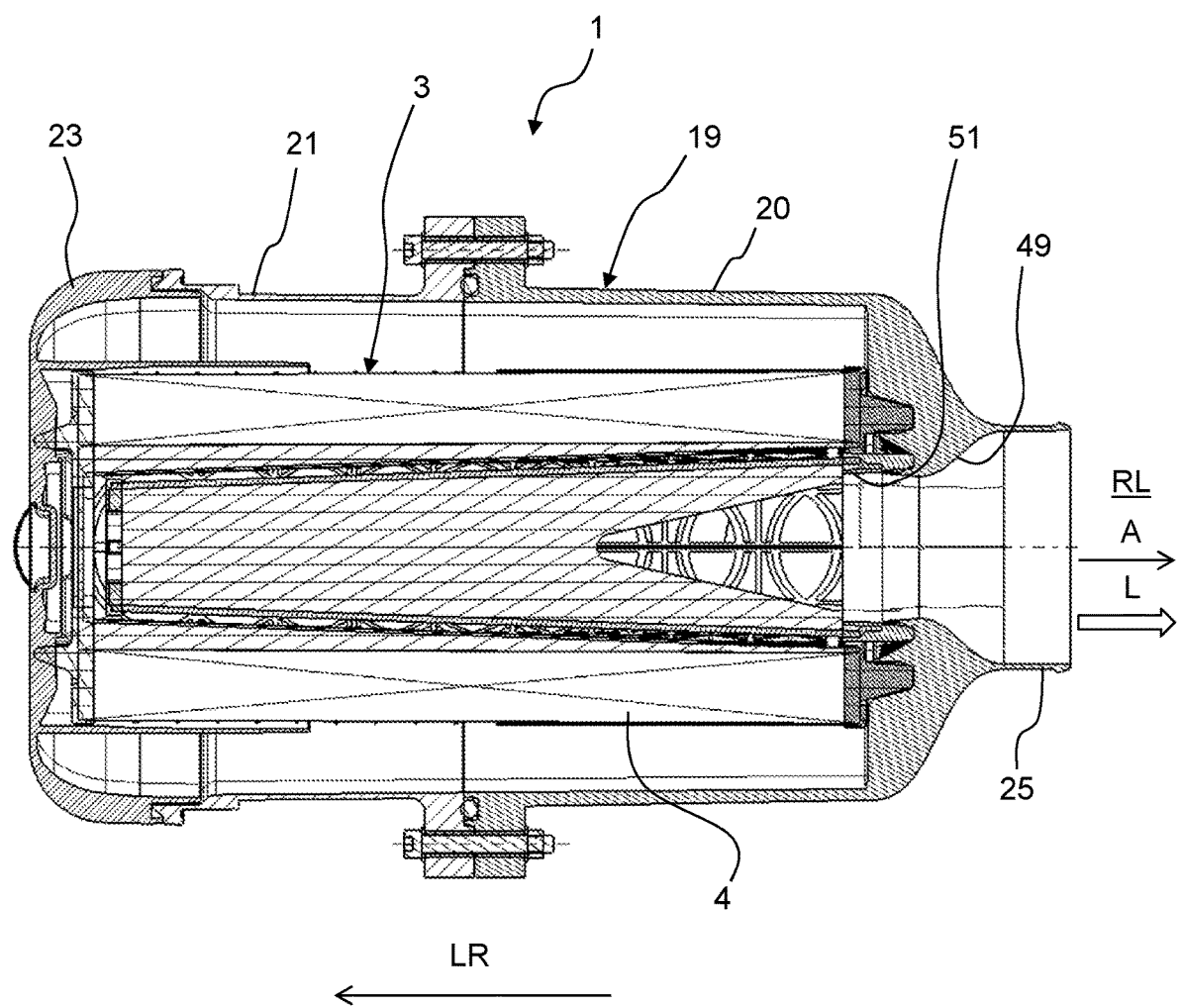
FIG. 29 illustrates a schematic sectional view of the filter arrangement according to FIG. 26.

FIG. 26 illustrates a schematic perspective view of another embodiment of a filter arrangement 1. FIG. 27 illustrates a rear view of the filter arrangement 1. The filter arrangement 1 includes a filter holder 2. The filter holder 2 according to FIG. 26 differs from the filter holder 2 according to FIG. 1 in having a modified transition section 49. As illustrated in FIG. 27, the fluid exit opening 51 of the filter element 3 is oval, and a fluid outlet 25 of the filter holder 2 is circular. The fluid outlet 25 has a circular cross-section facing away from the filter element 3 and has an oval cross-section facing toward the filter element 3. The circular cross-section of the fluid outlet 25 on the side facing away from the filter element 3 preferably has a diameter that is greater than the small diameter of the oval cross-section on the side of the fluid outlet 25 facing toward the filter element 3, and/or that is greater than the diameter of the sealing device 18 in the smaller expansion (in the height direction hr). As FIGS. 28 and 29 illustrate in two schematic sectional views of the filter arrangement 1, a transition between the round fluid outlet 25 and the oval fluid exit opening 51 of the filter element 3 is reached through a curved transition section 49 that is arranged between the fluid outlet 25 and the fluid exit opening 51 of the filter element 3. One advantage of the oval shape of the fluid exit opening 51 of the filter element 3 is the large cross-sectional area thereof. This, in spite of the constriction between the fluid outlet 25 and the fluid exit opening 51 of the filter element 3 illustrated in FIG. 29, results in only a less adverse effect on the pressure loss.

Figure 30:
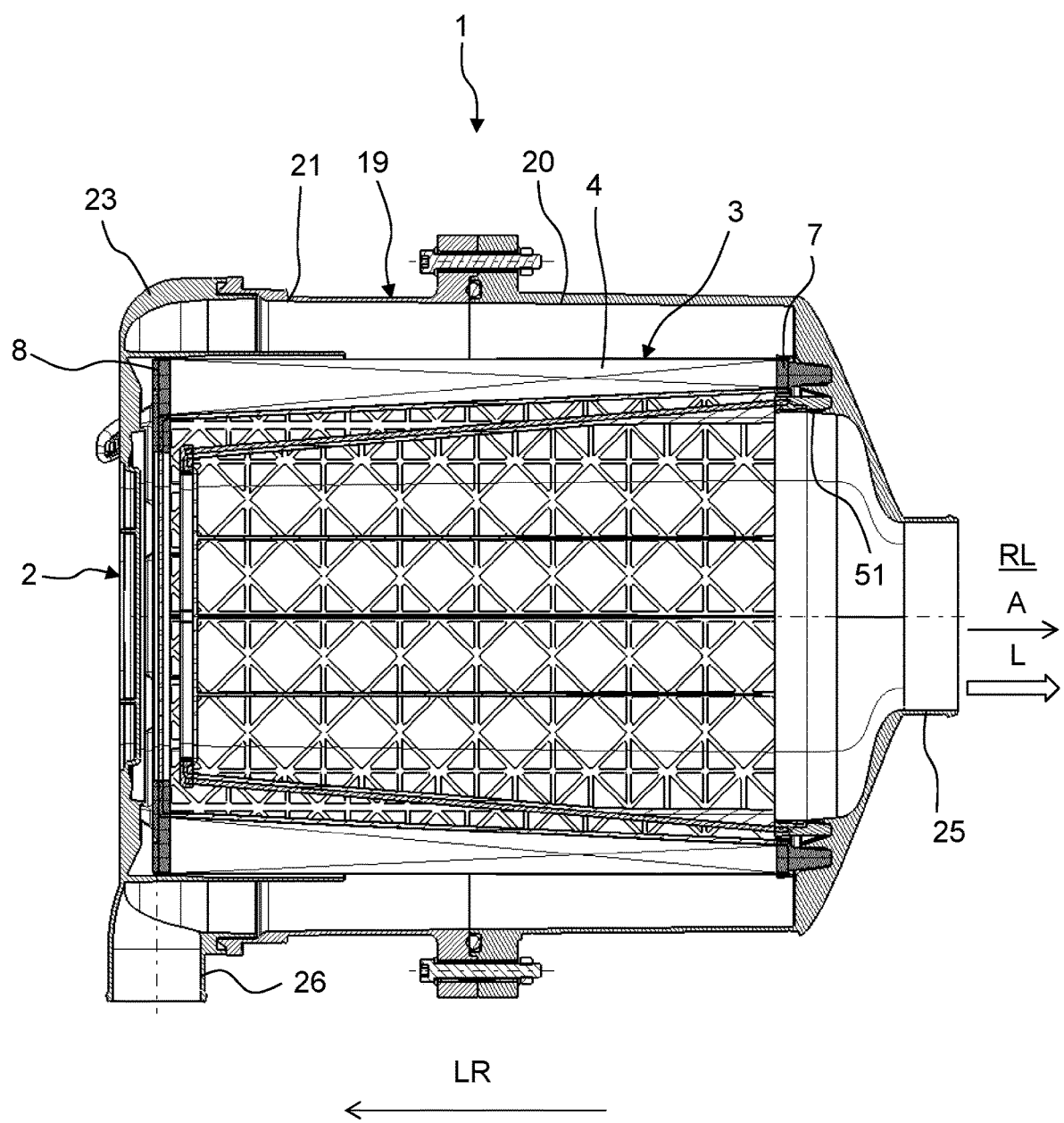
FIG. 30 illustrates a schematic sectional view of the filter arrangement according to FIG. 26.
Figure 31:
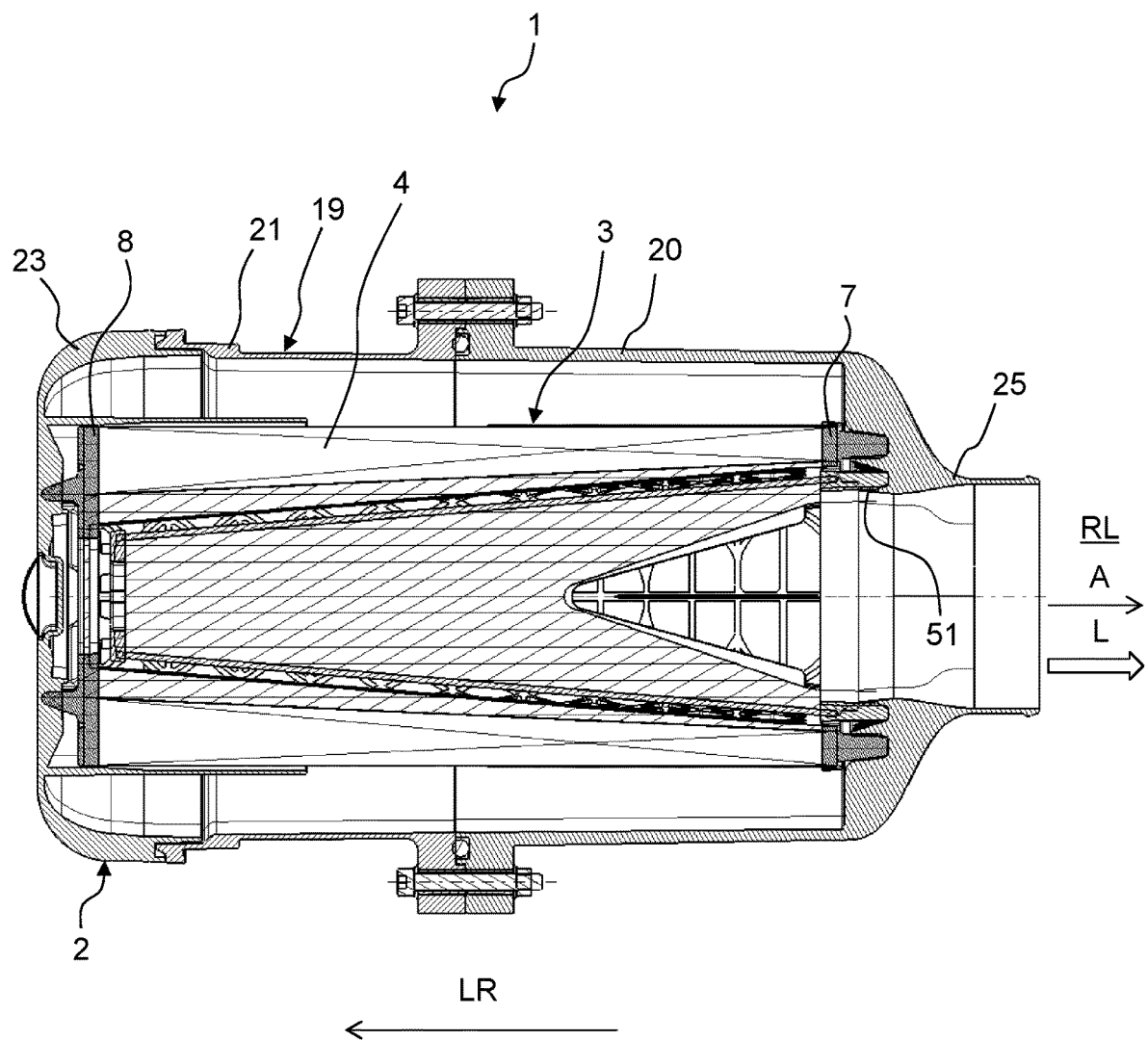
FIG. 31 illustrates a schematic sectional view of the filter arrangement according to FIG. 26.

The filter element 3 may, as illustrated in FIGS. 30 and 31, continue to taper conically on the inside, i.e., a cross-section of a filter medium 4 of the filter element 3 increases going away from a first end plate 7 in the direction of a second end plate 8 of the filter element 3. This makes it possible to achieve an enlarged fluid exit opening 51 of the filter element 3, in comparison to a non-conically tapered filter body 4.

LIST OF REFERENCE SIGNS

1 Filter arrangement
2 Filter holder or filter housing
3 Filter element
4 Filter body
5 Central tube
6 Thread winding
7 End plate (in particular, open end plate)
8 End plate (in particular, closed end plate)
9 Front side
10 Sealing device
11 Receiving opening
12 Inflow protector
13 Secondary element
14 Filter medium of the secondary element
15 End plate of the secondary element (in particular, open)
16 End plate of the secondary element (in particular, closed)
17 Central tube of the secondary element
18 Sealing device of the secondary element
19 Holding section of the filter holder
20 Housing part
21 Housing part
22 Fastening means
23 Maintenance cover
24 Fluid inlet
25 Fluid outlet
26 Particle discharge opening
27 Engagement region, in particular for the sealing device 10 of the filter element 3
28 Engagement region, in particular for the sealing device 18 of the secondary element 13
29 Outer surface, in particular of the filter body 4
30 Wall, in particular of the holding section 19
31 Wall, in particular for guiding flow within the filter holder
32 Arrow, in particular in the direction of flow through the filter element 3
33 Particles
34 Bracing element
35 Curvature section, in particular of lesser curvature
36 Curvature section, in particular of lesser curvature
37 Straight line
38 Curvature section, in particular of greater curvature
39 Curvature section, in particular of greater curvature
40 Straight line, in particular center line
41 Outer contour, in particular of the sealing device 10
42 Outer contour, in particular of the end plate 7 and/or 8
43 Inner surface, in particular of the sealing device 10, in particular, sealing surface
44 Sealing lip, in particular having a radially inward sealing edge or sealing surface
45 Sealing lip, in particular having radially outward or inward sealing edge or sealing surface
46 Cavity, in particular groove between the sealing lips 44, 45
47 Guide element
48 Inflow protector, in particular on the maintenance cover 23
49 Transition section, in particular at the fluid inlet 24
50 Curvature
51 Fluid exit opening, in particular through the end plate 15 of the secondary element 13
270 Sealing contact surface of the engagement region 27
280 Sealing contact surface of the engagement region 28
a Distance
A Outflow direction
$a_{37}$ Length
$a_{40}$ Length
b Width
br Width direction
E Inflow direction
h Height
hr Height direction
L Fluid
LR Longitudinal direction
MA Central axis
M35 Center of curvature
M36 Center of curvature
M38 Center of curvature
M39 Center of curvature RE Post-filtration side
RO Pre-filtration side
R35 Radius of curvature
R36 Radius of curvature
R38 Radius of curvature
R39 Radius of curvature
u Circumference
UL Overlap region
VK Comparison curve
αAngle of curvature

We claim:
1. A filter element, comprising:
an oval filter body of a filter medium elongated in a longitudinal direction having a central axis arranged extending through a center of the oval filter body, the oval filter body having:
  an outer circumferential contour of the oval filter body of filter medium is formed by:
    curvature contour sections; and
    partially straight or curved contour sections;
  wherein the curvature contour sections include:
    a first curvature contour section and a second curvature contour section which are convex and have a first radius curvature,
    wherein the first curvature contour section and the second curvature contour section form opposite sides of the outer circumferential contour of the oval filter body of filter medium;
  wherein the partially straight or curved contour sections include:
    a first partially straight or curved contour section and a second partially straight or curved contour section, wherein the first radius of curvature of the curvature contour sections is less than a radius of curvature of the partially straight or curved contour sections;
    wherein the first partially straight or curved contour section and the second partially straight or curved contour section form opposite sides of the outer circumferential contour of the oval filter body of filter medium;
a first end plate having a radially inner contour forming a receiving opening extending through the first end plate, the first end plate secured to a first axial end of the oval filter body;
a circumferential sealing device arranged on outer surface of the first end plate, between a radially outer contour of the first end plate and the radially inner contour of the first end plate, the circumferential sealing device configured to radially seal the filter element off from a filter holder into which the filter element is receivable,
  wherein the circumferential sealing device comprises:
    two first sealing device curvature sections arranged one facing the other; and
    two second sealing device curvature sections arranged one facing the other,
    wherein the first sealing device curvature sections each have a first radius of curvature,
    wherein the second sealing device curvature sections each have a second radius of curvature,
    wherein the second radius of curvature of the second sealing device curvature sections is larger than the first radius of curvature of the first sealing device curvature sections,
    wherein the two second sealing device curvature sections are each arranged between and connected directly or indirectly at opposing ends to different adjacent ones of the two first sealing device curvature sections,
    wherein the circumferential sealing device is a continuous materially integral oval circumferential sealing device surrounding the radially inner contour of the first end plate, and
  wherein the first sealing device curvature sections have a smaller radius of curvature than the radially outer contour of the first end plate and the radially inner contour of the first end plate and the oval filter body in the region of the second sealing device curvature sections;
  wherein the second sealing device curvature sections at a location midway between the opposing ends of the second sealing device curvature sections is positioned at a radial distance d1 relative to the outer circumferential contour of the filter body and/or a radially outer contour of the first end plate;
  wherein the circumferential sealing device at a position of at least one of the opposing ends of the first sealing device curvature sections is positioned at a radial distance d3 relative to the outer circumferential contour of the filter body and/or the radially outer contour of the first end plate;
  wherein the first sealing device curvature sections at a location midway between the opposing ends of the first sealing device curvature sections is positioned at a distance d2 relative to the outer circumferential contour of the filter body and/or the radially outer contour of the first end plate;
  wherein d3>d2 and d3>d1, such that the circumferential sealing device is oval and has an outer contour which is not parallel to the radially outer contour of the first end plate.
2. The filter element according to claim 1, wherein
the second radius of curvature of the second sealing device curvature sections is smaller than the radius of curvature of the partially straight or curved contour sections of the oval filter body.
3. The filter element according to claim 1, wherein
at least one of the first sealing device curvature sections has a center portion that protrudes radially outwardly on the outer surface of the first end plate to have a smallest distance to the radially outer contour of the first end plate or to the outer circumferential contour of the filter body, compared to the two second sealing device curvature sections.
4. The filter element according to claim 1, wherein
the centers of curvature of the first radius of curvature of the two first sealing device curvature sections are arranged on a first straight line;
wherein the centers of curvature of the second radius of curvature of the two second sealing device curvature sections are arranged on a second straight line; and
wherein the first straight line is positioned so as to be perpendicular to the second straight line.
5. The filter element according to claim 4, wherein
the second straight line is arranged centrally between the centers of curvature of the first radius of curvature of the two first sealing device curvature sections; and/or
the first straight line is arranged centrally between the centers of curvature of the second radius of curvature of the two second sealing device curvature sections.
6. The filter element according to claim 1, wherein
The circumferential sealing device has an an inner surface or a sealing surface that is arranged so as not to be parallel to the radially outer contour of the first end plate and/or the outer circumferential contour of an outer surface of the filter body.

7. The filter element according to claim 1, wherein the filter element comprises:
an inflow protector arranged circumferentially enclosing the outer circumferential contour of the oval filter body over at least a portion of an axial length of the oval filter body.

8. The filter element according to claim 7, wherein
the inflow protector is adhesively fixed onto, welded onto, or fused onto the oval filter body and/or the first end plate.

9. The filter element according to claim 7, wherein
the inflow protector is fluid-tight, impermeable to fluid flow through the inflow protector.

10. The filter element according to claim 7, wherein
the inflow protector runs annularly about an exterior of the oval filter body.

11. The filter element according to claim 1, wherein
the first sealing device curvature sections are connected to one another by the second sealing device curvature sections in such a manner that the first and second sealing device curvature sections each merge continuously into one another.

12. The filter element according to claim 1, wherein
the oval filter body has an oval cross section defined by the filter medium of the oval filter body;
wherein the circumferential sealing device is arranged within an imaginary axial continuation of the outer circumferential contour of the oval filter body and/or the oval cross-section of the filter body and/or the radially outer contour of the first end plate in the longitudinal direction.

13. The filter element according to claim 1, wherein
the circumferential sealing device which has a seal inner surface in a middle of partially straight or curved contour sections of the oval filter body and/or of the circumferential sealing device which has a smaller distance to the outer circumferential contour of the oval filter body and/or the radially outer contour of the first end plate than in a transitional region between the more- and less-curved curvature sections of the oval filter body and/or the circumferential sealing device.

14. A filter arrangement, comprising:
the filter element according to claim 1;
a filter holder having a holding section; and
wherein the filter element is held in the holding section of the filter holder,
wherein the circumferential sealing device is configured to radially seal the filter element off from a filter holder into which the filter element is receivable.

15. The filter arrangement according to claim 14, wherein the holding section comprises
an engagement region, with which a circumferential sealing device of the filter element engages, and
wherein the circumferential sealing device rests against the engagement region with an inner surface.

* * * * *